(12) United States Patent
Hemphill et al.

(10) Patent No.: US 9,441,658 B2
(45) Date of Patent: Sep. 13, 2016

(54) STRUCTURAL TUBE

(71) Applicants: Derek Jay Hemphill, Ankeny, IA (US); Jake Bigelow, Winterset, IA (US); Jason Hoffman, Ankeny, IA (US); Ross Robert Ingwersen, Des Moines, IA (US); Christopher Alan Jacob, Ankeny, IA (US); Ryan Oliver, Grimes, IA (US); Brandon Lee Schafer, Newton, IL (US)

(72) Inventors: Derek Jay Hemphill, Ankeny, IA (US); Jake Bigelow, Winterset, IA (US); Jason Hoffman, Ankeny, IA (US); Ross Robert Ingwersen, Des Moines, IA (US); Christopher Alan Jacob, Ankeny, IA (US); Ryan Oliver, Grimes, IA (US); Brandon Lee Schafer, Newton, IL (US)

(73) Assignee: CTB Midwest, Inc., Milford, IN (US)

( * ) Notice: Subject to any disclaimer, the term of this patent is extended or adjusted under 35 U.S.C. 154(b) by 0 days.

(21) Appl. No.: 14/516,037

(22) Filed: Oct. 16, 2014

(65) Prior Publication Data

US 2015/0211562 A1    Jul. 30, 2015

Related U.S. Application Data

(63) Continuation of application No. 13/770,585, filed on Feb. 19, 2013, now Pat. No. 8,887,461, and a continuation of application No. 13/400,266, filed on Feb. 20, 2012, now Pat. No. 8,528,282.

(51) Int. Cl.
| | |
|---|---|
| *E04B 1/18* | (2006.01) |
| *E04B 1/19* | (2006.01) |
| *E04H 12/00* | (2006.01) |
| *F16B 9/02* | (2006.01) |
| *E04C 3/30* | (2006.01) |
| *E04B 1/24* | (2006.01) |
| *E04H 12/22* | (2006.01) |
| *E04B 1/26* | (2006.01) |
| *E04C 3/32* | (2006.01) |

(52) U.S. Cl.
CPC .  *F16B 9/02* (2013.01); *E04B 1/24* (2013.01); *E04C 3/30* (2013.01); *E04B 2001/246* (2013.01); *E04B 2001/2415* (2013.01); *E04B 2001/2451* (2013.01); *E04B 2001/2463* (2013.01); *E04B 2001/2496* (2013.01); *E04B 2001/2648* (2013.01); *E04C 3/32* (2013.01); *E04H 12/2261* (2013.01); *Y10T 403/39* (2015.01)

(58) Field of Classification Search
None
See application file for complete search history.

(56) References Cited

U.S. PATENT DOCUMENTS

| | | | | | |
|---|---|---|---|---|---|
| 1,185,207 | A | * | 5/1916 | Lally | 52/283 |
| 2,574,074 | A | * | 11/1951 | Vogel | 52/377 |
| 3,837,754 | A | * | 9/1974 | Malcik | 403/217 |
| 4,104,000 | A | * | 8/1978 | Fleischmann | 403/7 |
| 4,185,422 | A | * | 1/1980 | Radek | 52/36.6 |
| 4,334,374 | A | * | 6/1982 | Spamer et al. | 40/607.02 |
| 4,719,730 | A | * | 1/1988 | Winkowski | 52/238.1 |
| 4,850,169 | A | * | 7/1989 | Burkstrand et al. | 52/241 |
| 4,863,305 | A | * | 9/1989 | Schold | E04B 1/2604 403/171 |
| 4,914,878 | A | * | 4/1990 | Tamaki et al. | 52/239 |
| 4,926,592 | A | * | 5/1990 | Nehls | 52/98 |
| 4,934,858 | A | * | 6/1990 | Beaulieu | 403/174 |
| 4,941,717 | A | * | 7/1990 | Beaulieu | 312/265.3 |

(Continued)

*Primary Examiner* — Elizabeth A Quast
*Assistant Examiner* — Kyle Walraed-Sullivan
(74) *Attorney, Agent, or Firm* — David M. Breiner; BrownWinick Law Firm

(57) ABSTRACT

Provided is a structure that may include a structural tube having at least one slot extending from an end thereof, an end plate attached to the end of the structural tube, and at least one cross member extending through the at least one slot, the at least one cross member including a first region outside of the structural tube and a second region inside the structural tube.

20 Claims, 39 Drawing Sheets

(56) References Cited

U.S. PATENT DOCUMENTS

| | | | | |
|---|---|---|---|---|
| 5,044,137 | A * | 9/1991 | Shigeru et al. | 52/286 |
| 5,421,556 | A * | 6/1995 | Dodge et al. | 256/1 |
| 5,495,952 | A * | 3/1996 | Kainz | 211/90.04 |
| 5,535,555 | A * | 7/1996 | Boyd et al. | 52/99 |
| 5,568,909 | A * | 10/1996 | Timko | 248/519 |
| 5,579,621 | A * | 12/1996 | Fang | 52/483.1 |
| 5,896,721 | A * | 4/1999 | Sugiyama | 52/712 |
| 5,901,525 | A * | 5/1999 | Doeringer et al. | 52/835 |
| 5,930,963 | A * | 8/1999 | Nichols | 52/239 |
| 6,218,612 | B1 * | 4/2001 | McKitrick et al. | 174/495 |
| 6,272,796 | B1 * | 8/2001 | Metzler | 52/93.1 |
| 6,508,457 | B1 * | 1/2003 | Knudson et al. | 256/65.01 |
| 6,546,684 | B2 * | 4/2003 | Waalkes et al. | 52/239 |
| 6,640,517 | B2 * | 11/2003 | Mitchell | 52/298 |
| 6,817,147 | B1 * | 11/2004 | MacDonald | 52/220.7 |
| 6,910,306 | B2 * | 6/2005 | Waalkes et al. | 52/239 |
| 7,266,932 | B2 * | 9/2007 | Rowan | 52/656.1 |
| 7,651,073 | B1 * | 1/2010 | Gibbs | 256/59 |
| 8,104,734 | B2 * | 1/2012 | Stover | 248/519 |
| 8,635,830 | B2 * | 1/2014 | Schold | 52/650.1 |
| 2001/0037612 | A1 * | 11/2001 | Militzer | 52/36.1 |
| 2004/0035065 | A1 * | 2/2004 | Orszulak et al. | 52/167.1 |
| 2006/0080918 | A1 * | 4/2006 | Clubbe | 52/238.1 |
| 2006/0156659 | A1 * | 7/2006 | Hsueh | 52/239 |
| 2006/0174563 | A1 * | 8/2006 | Fumagalli | 52/239 |
| 2007/0186503 | A1 * | 8/2007 | Homma | E04B 1/2604 52/655.1 |
| 2011/0280649 | A1 * | 11/2011 | Dewson et al. | 403/171 |
| 2013/0227906 | A1 * | 9/2013 | Schold | E04B 1/26 52/650.1 |
| 2013/0326993 | A1 * | 12/2013 | Schold | 52/655.1 |

* cited by examiner

STRUCTURAL TUBE

CROSS REFERENCE TO RELATED APPLICATIONS

This application is a continuation of U.S. application Ser. No. 13/770,585 filed on Aug. 29, 2013 in the United States Patent and Trademark Office which in turn is a continuation of U.S. application Ser. No. 13/400,266 filed on Feb. 20, 2012 in the United States Patent and Trademark Office, the entire contents of each of which are herein incorporated by reference.

BACKGROUND

1. Field

Example embodiments relate to a structure having a structural tube, at least one cross member, and an end plate. Example embodiments also relate to a method of fabricating the structure. Example embodiments also relate to a system having the structure.

2. Description of the Related Art

In the conventional art, plates are often secured to an end of a structural tube in order to attach the structural tube to another structural member or to anchor the tube to the ground. FIG. 1, for example, illustrates an example of an end plate 10 attached to an end of a structural tube steel member 15. In the conventional art, the structural tube steel member 15 is attached to the end plate 10 by welding. For example, an all around fillet weld, a stitch weld, a two-sided fillet weld, three-sided fillet weld, or a four-sided fillet weld applied at the interface between the structural tube steel member 15 and the end plate 10 may be provided to secure the structural tube steel member 15 to the end plate 10.

In general, an end plate may include a plurality of holes through which connecting members, for example, bolts, may pass. For example, in FIG. 1 the end plate 10 includes four holes 20 (three of which are illustrated) arranged near corners of the end plate 10. FIG. 2 is an example of the conventional end plate 10 secured to a concrete foundation 30 via a plurality of anchor bolts 25. Although not shown in FIG. 2, the anchor bolts 25 could be substantially L-shaped or J-shaped or could include a flared end to ensure the bolts are not easily removed from the foundation 30.

In the conventional art, stiffeners may be employed to stiffen the base of tube steel members. FIG. 3, for example, illustrates a plurality of stiffeners 40 welded to the structural tube steel member 15 and the end plate 10 illustrated in FIG. 1. In FIG. 3, for example, four stiffeners 40 (only three of which are shown) are welded to outside faces of the structural tube steel member 15. In the conventional art, the stiffeners 40 could induce relatively high local stresses in the structural tube steel member 15 in the event a relatively large bending moment is applied to the structural tube steel member 15. Thus, in the conventional art, plates are often provided between the stiffeners and the member to which they attach for stress reduction.

In FIGS. 1-3, the structural tube steel member 15 is shown as having a single end plate 10 at one end only, however, as one skilled in the art would understand, conventional tube steel members are often constructed with plates arranged at both ends of the structural tube steel member. For example, as shown in FIG. 4, a structural tube steel member 50 may have a first end plate 55 arranged at a first end of the structural tube steel member 50 and a second end plate 60 arranged at a second end of the structural tube steel member 60. As in the previous example, the first and second end plates 55 and 60 may be welded to the tube steel member 50. The structural tube steel member 50 of FIG. 4 may be substantially the same as the structural tube steel member 15 as shown in FIG. 3 and the first and second end plates 55 and 60 may be substantially the same as the end plate 10 illustrated in FIGS. 1-3. Furthermore, while not shown in FIG. 4, the stiffeners 40 illustrated in FIG. 3 may be attached at the interfaces between the structural tube steel member 50 and the first and second end plates 55 and 60 in the same manner as they are attached to the structural tube steel member 15 and the end plate 10 as shown in FIG. 3.

FIG. 5 represents a conventional frame having a first column 70 and a second column 75 connected by bracing 80. As shown in FIG. 5, the first and second vertical columns 70 and 80 may be constructed by attaching, end-to-end, structural tube steel members that have end plates provided at both ends. In this conventional example, the end-to-end structural tube steel members may be substantially the same as the structural tube steel member 50 with end plates 55 and 60 as shown in FIG. 4. Each of the structural tube steel members may be secured to each other via a plurality of bolts 85. The bracing 80 may be steel members such as angle iron, and the bracing 80 may be attached to the columns 70 and 80 by a series of tabs 90 which are welded to outside surfaces of the structural tube steel members. In the conventional art, the tabs 90 are offset from the end plates and resemble a plate with a hole to allow the bracing to be pinned thereto.

In the conventional art, welding plates (for example, stiffener plates and end plates) to structural tubing members is relatively expensive. Furthermore, directly welding a stiffener plate and tabs to an outside surface of a structural tube member renders the structural tube member vulnerable to relatively high stresses.

SUMMARY

Example embodiments relate to a structure having a structural tube, at least one cross member, and an end plate. Example embodiments also relate to a method of fabricating the structure. Example embodiments also relate to a system having the structure.

In accordance with example embodiments, a structure may include a structural tube having at least one slot extending from an end thereof, an end plate attached to the end of the structural tube, and at least one cross member extending through the at least one slot, the at least one cross member including a first region outside of the structural tube and a second region inside the structural tube.

In accordance with example embodiments, a structure may include a structural tube, a first cross member, a second cross member, and an end plate. In example embodiments, the structural tube may have a rectangular cross-section. The structural tube may have a first stepped slot on a first side of the structural tube, a second stepped slot on a second side of the structural tube, a third stepped slot on third side of the structural tube, and a fourth stepped slot on a fourth side of the structural tube. In example embodiments each of the first, second, third and fourth slots extend from an end of the structural tube. The first cross member may have a first region configured to act as a gusset plate, a second region spanning a width of the structural tube, and a third region configured to act as a stiffener plate. In example embodiments the first cross member may include a first surface and a second surface facing the first side of the structural tube and the third side of the structural tube. In example embodiments the first cross member may penetrate the first and third slots. In example embodiments the second cross member may have a fourth region configured to act as a gusset plate, a fifth region spanning a width of the structural tube, and a sixth region configured to act as a stiffener plate. In example embodiments, the second cross member may include a third surface and a fourth surface facing the second side of the structural tube and the fourth side of the structural tube. In example embodiments, the second cross member may penetrate the second and fourth slots. In example embodiments the end plate may have a first tab in the first slot, a second tab in the second slot, a third tab in the third slot, and a fourth tab in the fourth slot.

In accordance with example embodiments, a structure may include a column like member having a first end and a second end. In example embodiments the column like member may have a first slot on a first side of the column like member and a second slot on a second side of the column like member and the first slot and the second slot may be arranged between the first end and the second end. In example embodiments, the structure may further include a first cross member having a first portion extending through the first slot and a second cross member having a second portion extending through the second slot. In example embodiments, the first portion and the second portion may be locked together.

BRIEF DESCRIPTION OF THE DRAWINGS

Example embodiments are described in detail below with reference to the attached drawing figures, wherein.

DETAILED DESCRIPTION

Figure 1:
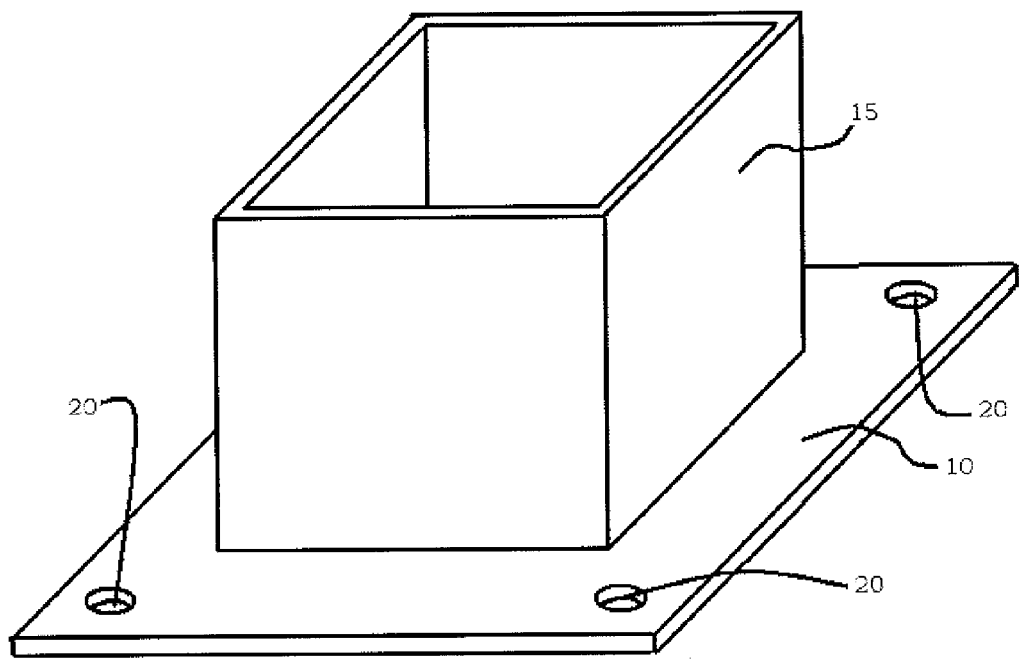
FIG. 1 is a view of a conventional tube steel member attached to a conventional end plate.
Figure 2:
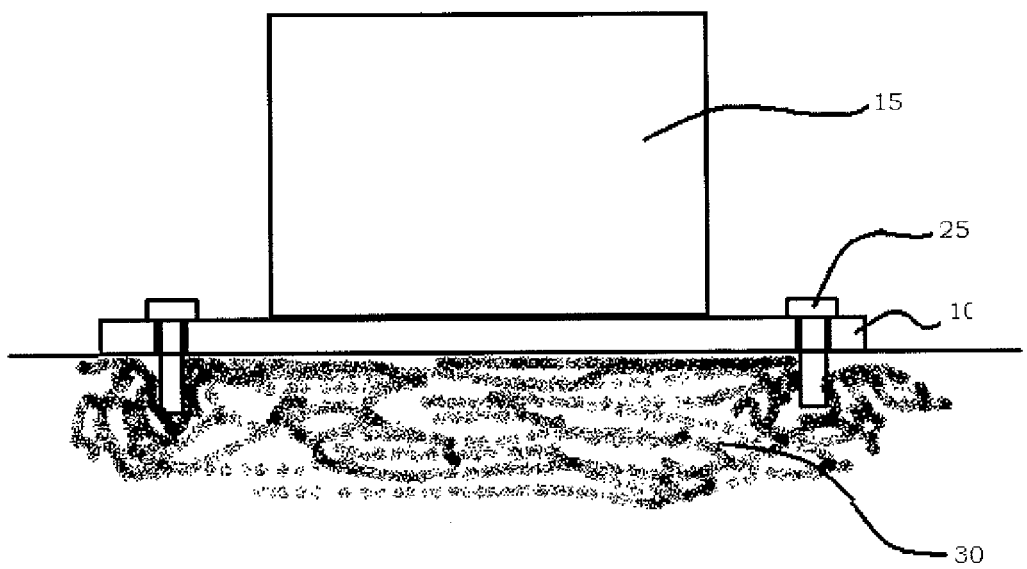
FIG. 2 is a view of the conventional tube steel member and the conventional end plate secured to a concrete foundation.
Figure 3:
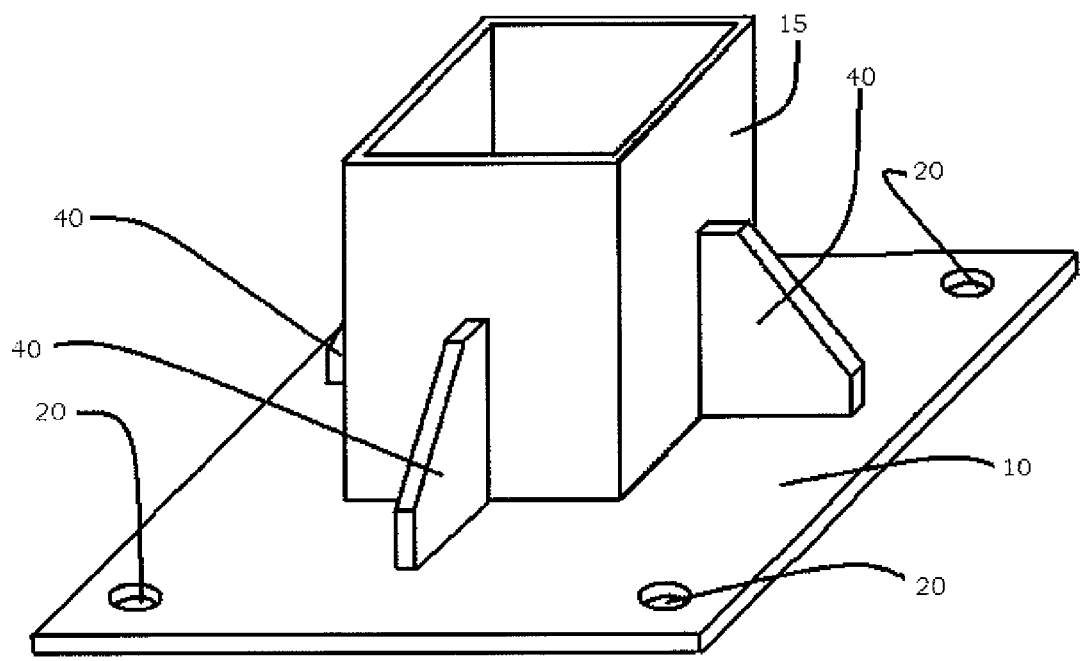
FIG. 3 is a view of the conventional tube steel member and conventional end plate with stiffeners attached thereto.
Figure 4:
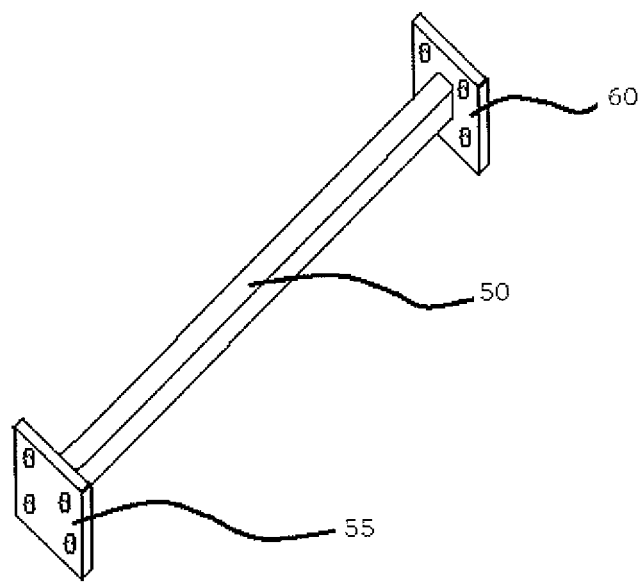
FIG. 4 is a view of a conventional tube steel member having end plates attached at two ends.
Figure 5:
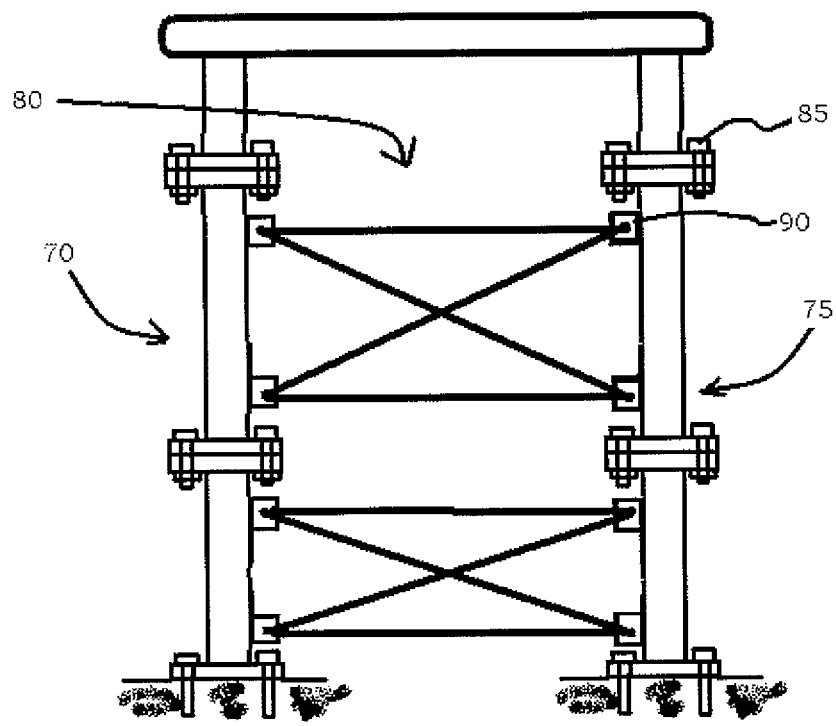
FIG. 5 is a view of a conventional frame that includes the conventional tube steel member having the end plates attached at two ends.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments of the invention relate to a structure that includes a structural tube, at least one cross member, and an end plate.

Figure 6:
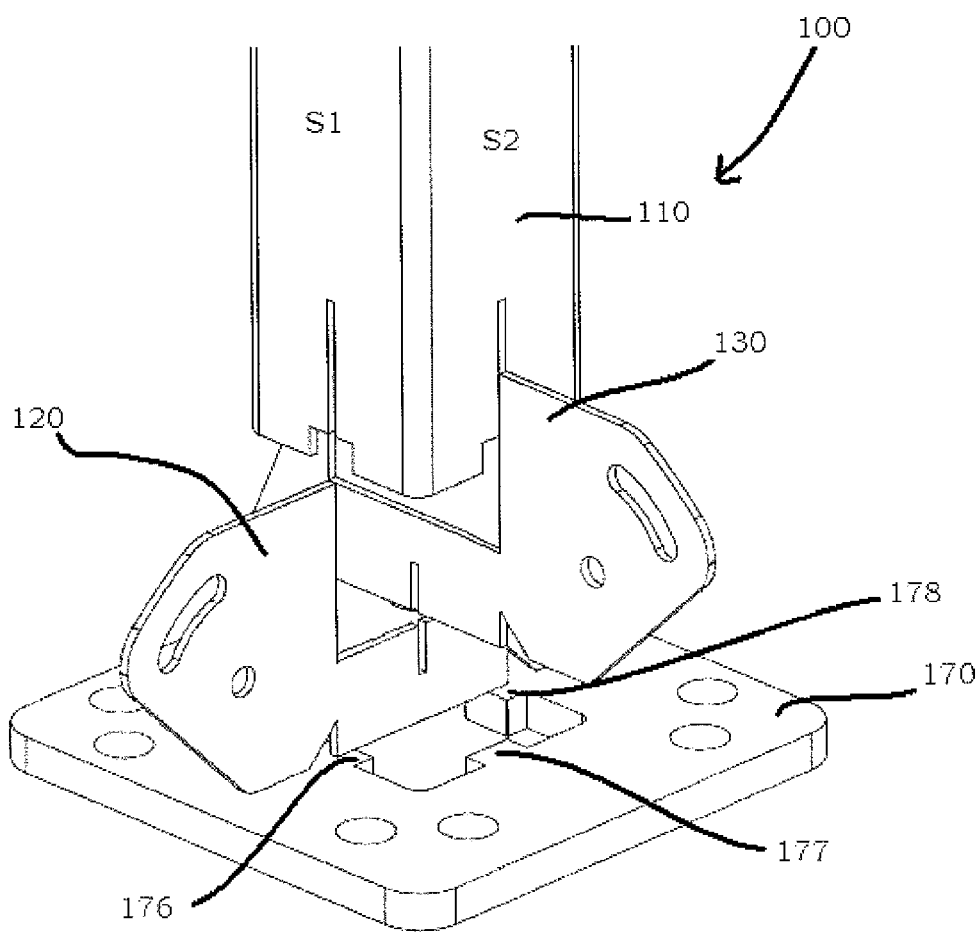
FIG. 6 is an exploded view of a structure in accordance with example embodiments.
Figure 7A:
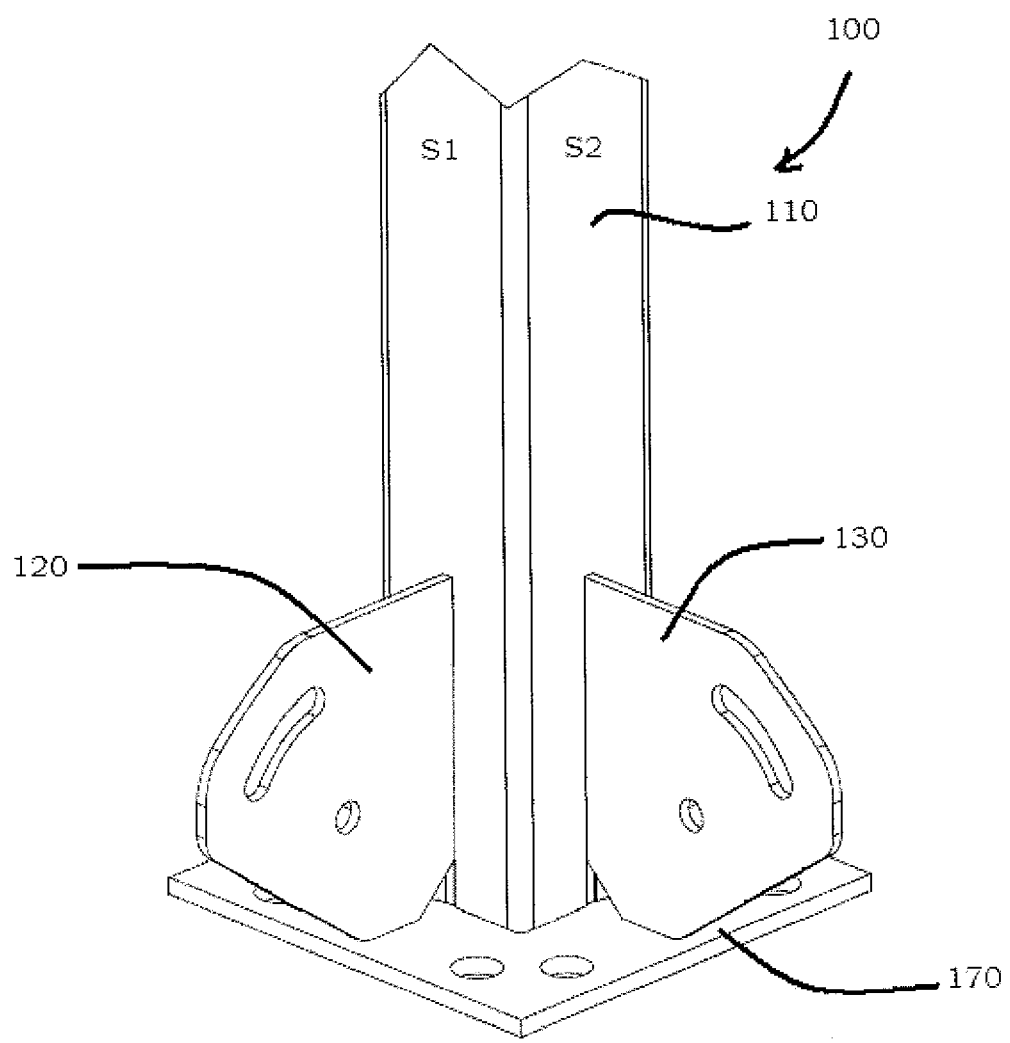
FIG. 7A is a top perspective view of the structure in accordance with example embodiments.
Figure 7B:
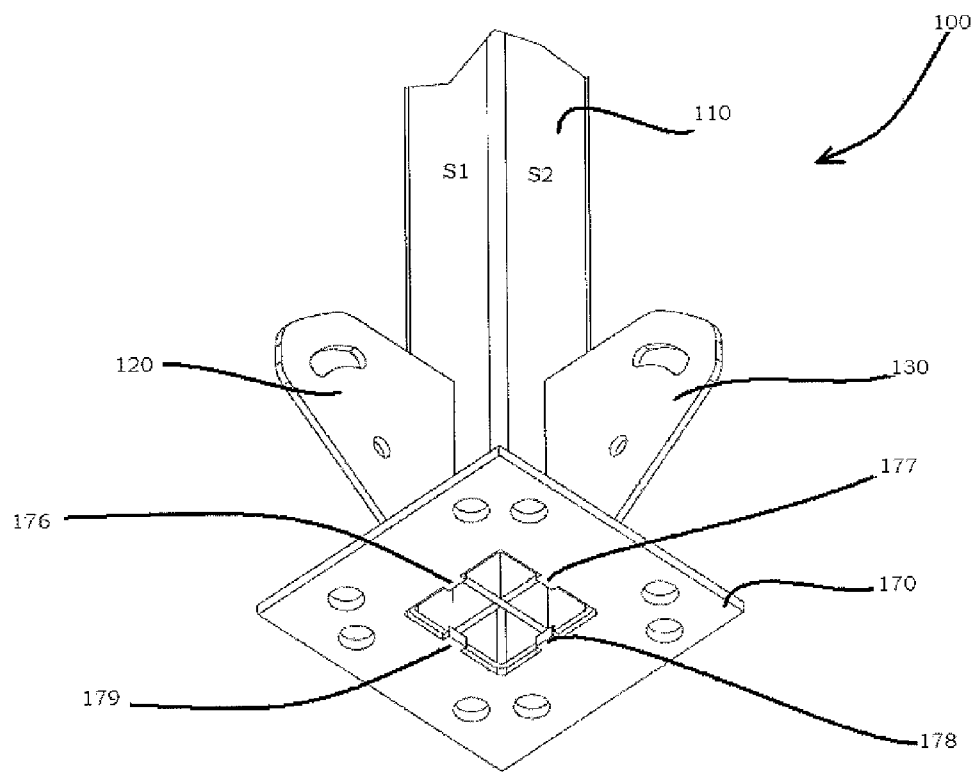
FIG. 7B is a bottom perspective view of the structure in accordance with example embodiments.

FIG. 6 is an exploded view of a structure 100 in accordance with example embodiments. FIGS. 7A and 7B are top and bottom perspective views of the assembled structure 100. In accordance with example embodiments, the structure 100 may include a structural tube 110, a first plate 120 (an example of a cross member), a second plate 130 (another example of a cross member), and an end plate 170. As shown in FIGS. 6, 7A, and 7B, the structure 100 includes slotted and tabbed members to form a relatively strong and compact structure which may be relatively easy to assemble. Various elements of the structure 100 will be explained below. In this application, the term "cross member" means a member that is arranged to penetrate a substantially closed structural member (for example, a tube) such that a portion of the member is inside the substantially closed structural member and a portion of the member is outside the substantially closed structural member. In example embodiments the cross member may be, for example, a plate, however, example embodiments are not limited thereto as the cross member may be another structure such as an angle or a structural "T".

Figure 8A:
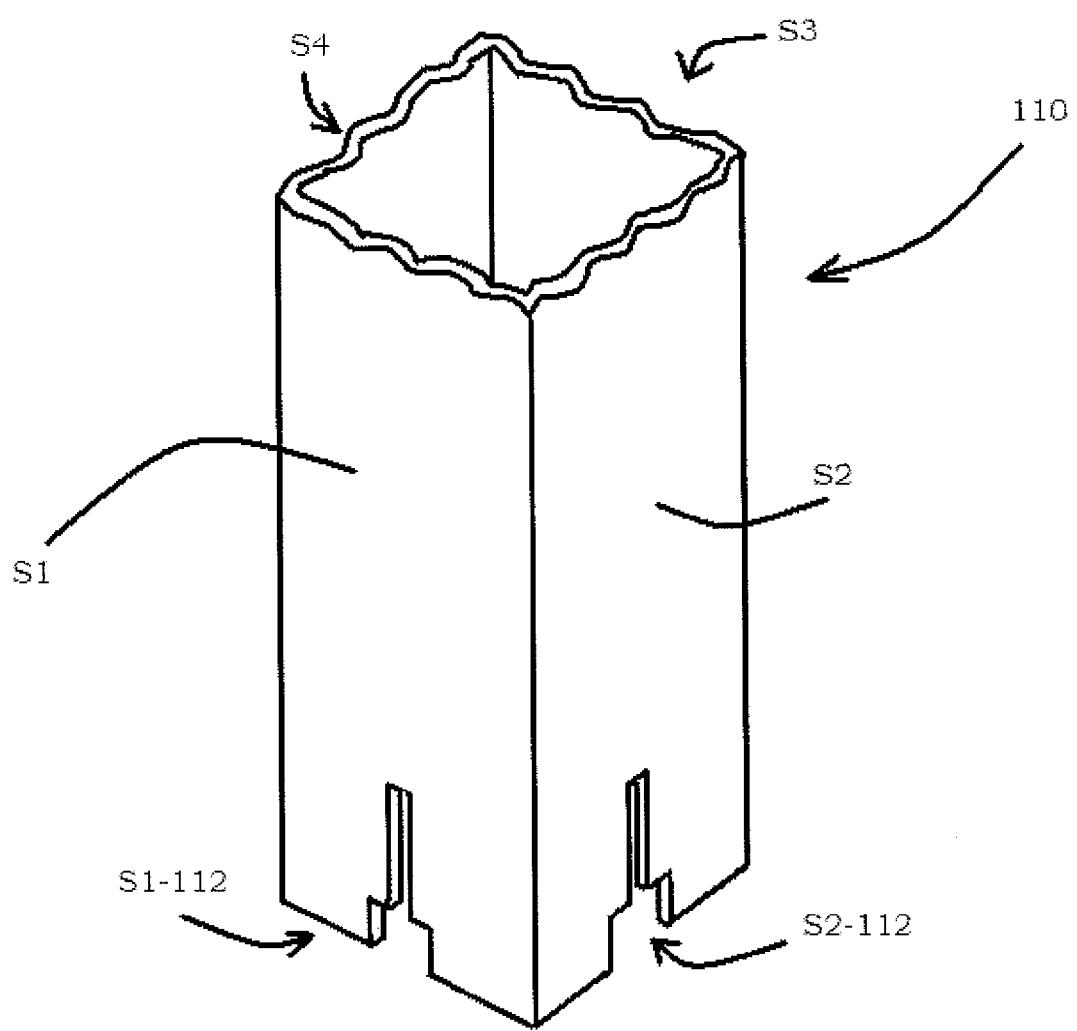
FIG. 8A is a perspective view of an end of a tube member in accordance with example embodiments.
Figure 28A:
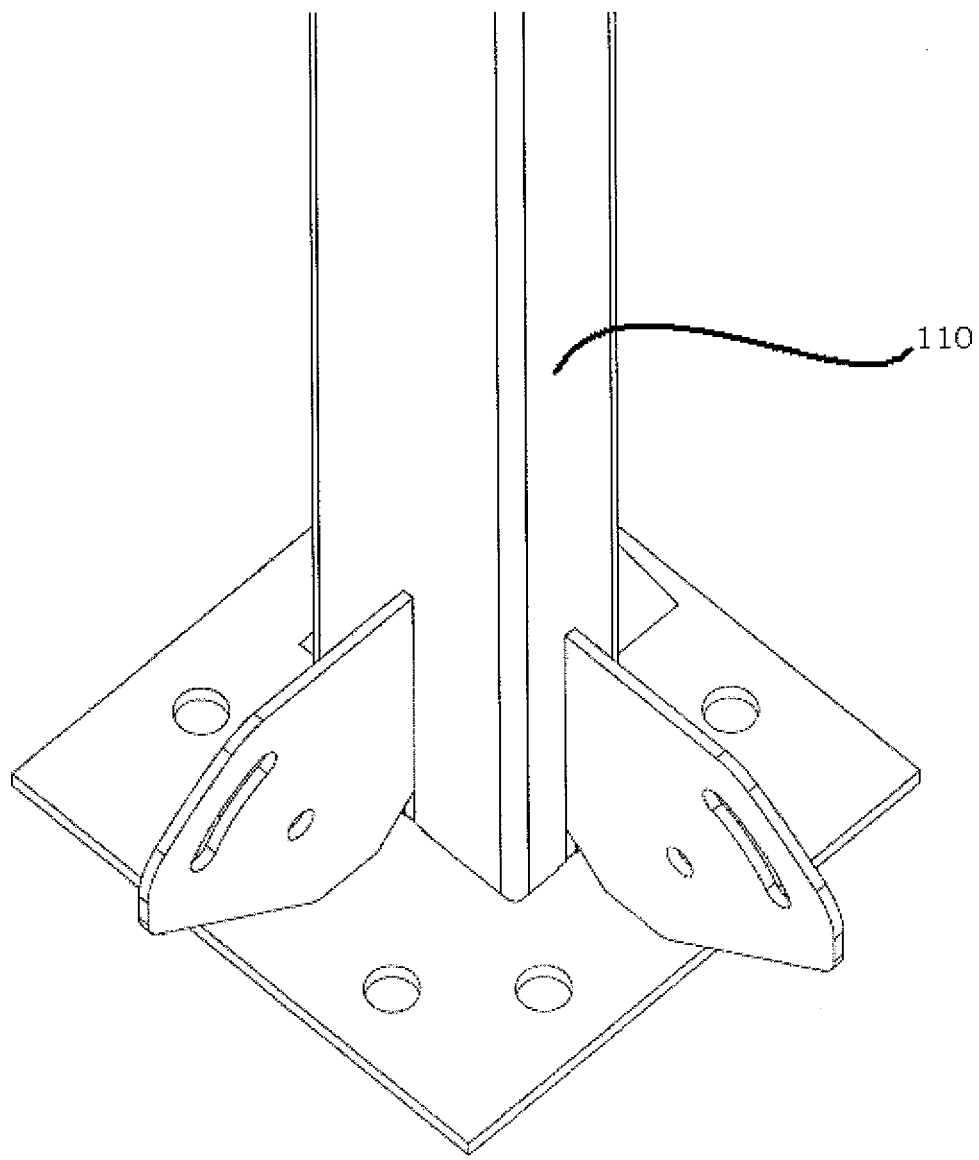
FIG. 28A a top perspective view of a structure in accordance with example embodiments.
Figure 28B:
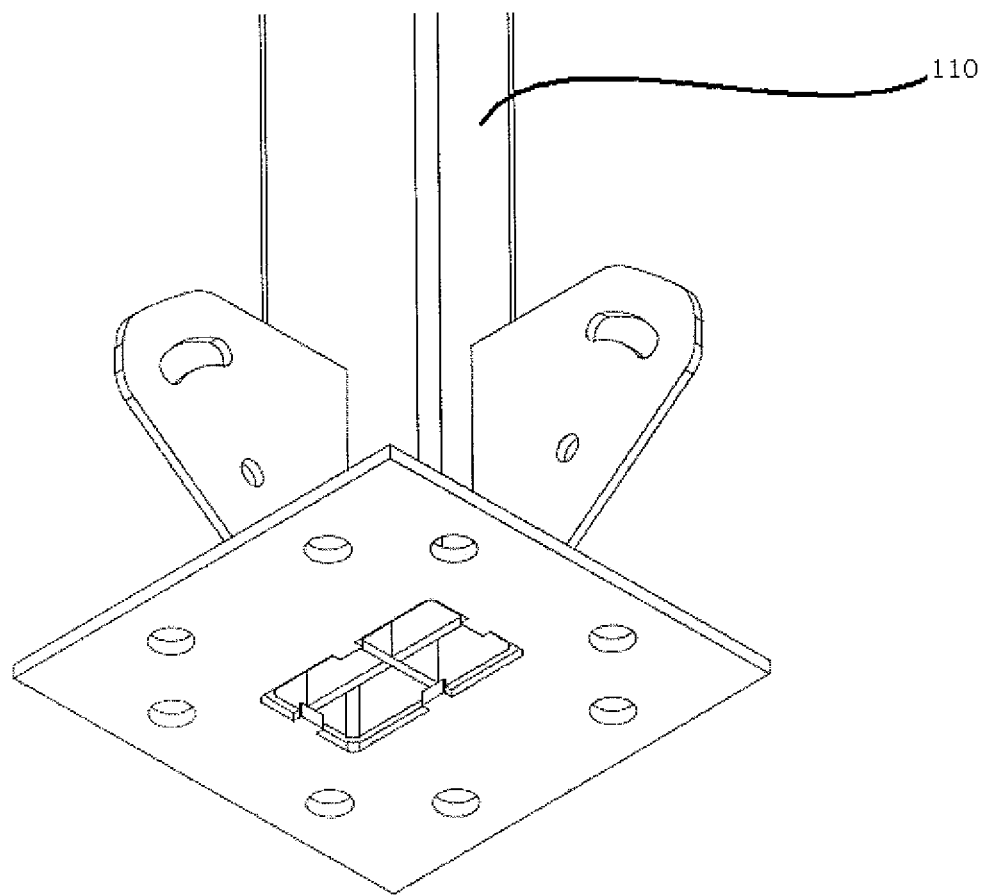
FIG. 28B is a bottom view of the structure in accordance with example embodiments.
Figure 29A:
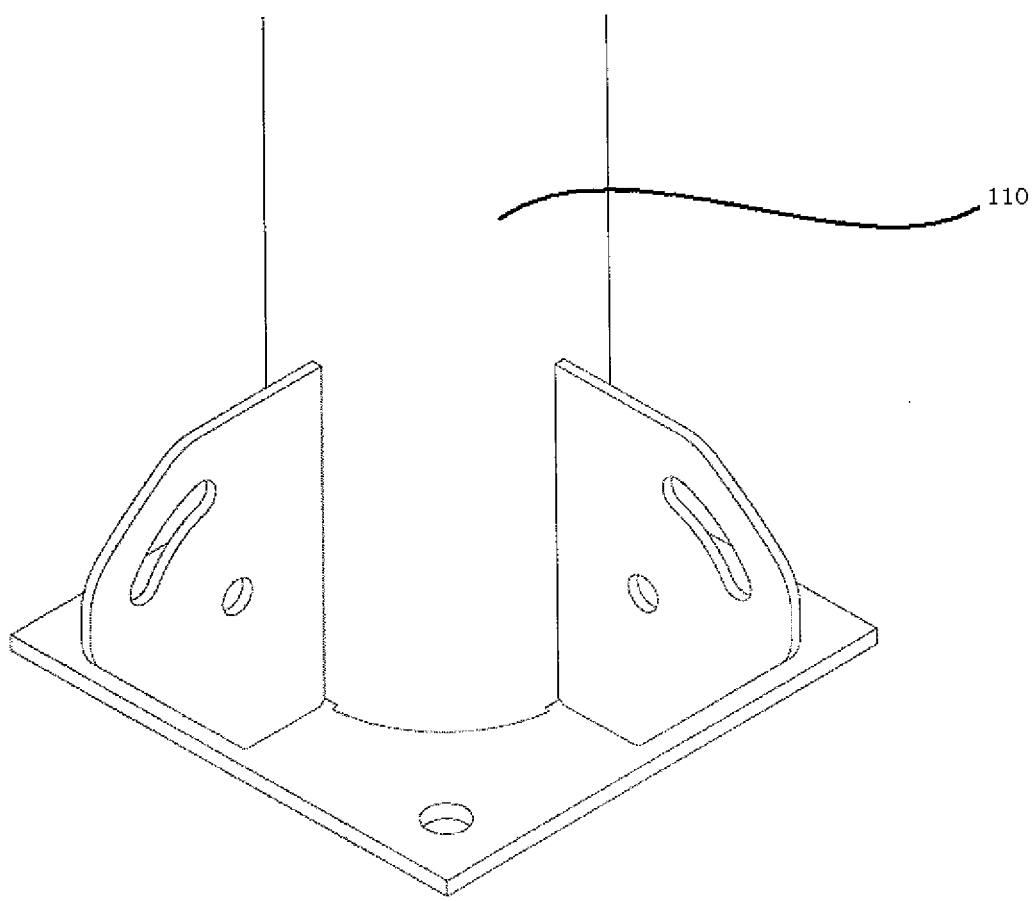
FIG. 29A a top perspective view of a structure in accordance with example embodiments.
Figure 29B:
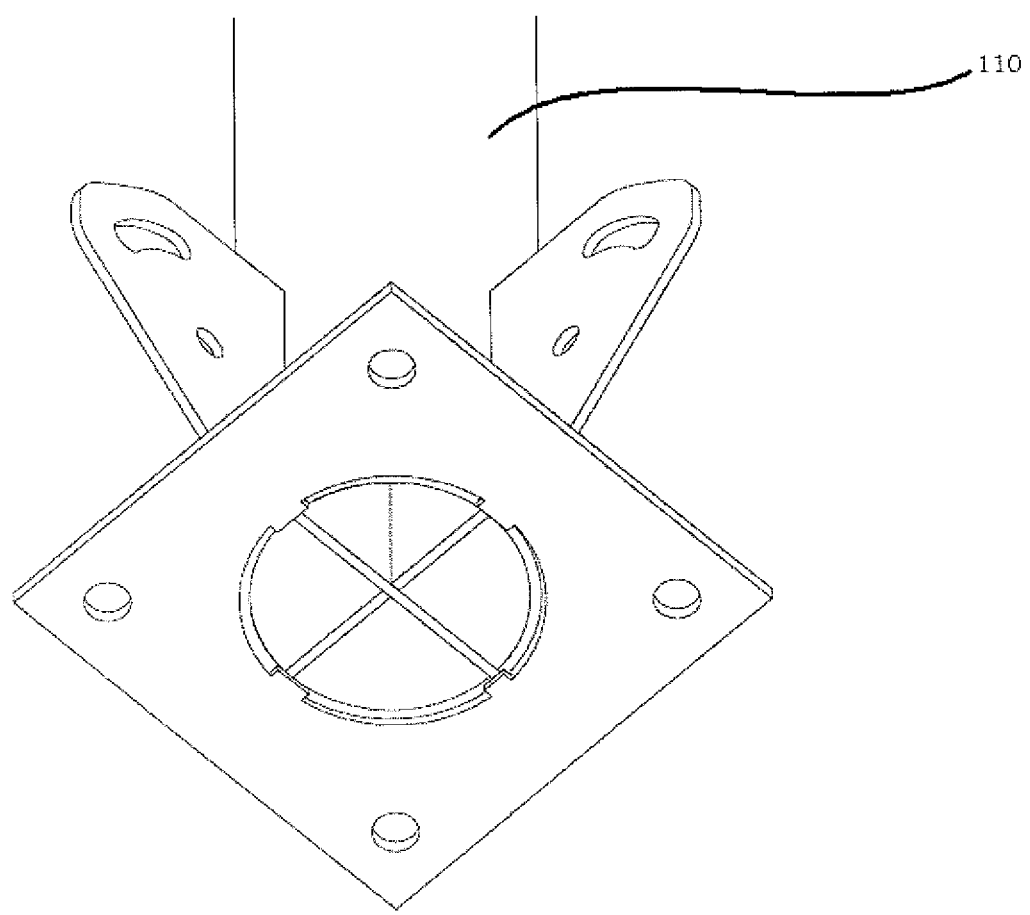
FIG. 29B is a bottom view of the structure in accordance with example embodiments.

In example embodiments, the structural tube 110 may be a tube steel member. In the alternative, the structural tube 110 may be made from aluminum, though example embodiments are not limited to either steel or aluminum. FIG. 8A is a perspective view of one end of the structural tube 110 according to example embodiments and FIGS. 8B-8E are elevation views of the various sides S1, S2, S3, and S4 associated with the end of the structural tube 110. Although the instant example embodiment is illustrated as having a structural tube 110 with a substantially square cross-section, example embodiments are not limited thereto as the structural tube 110 may have other cross-sectional shapes. For example, the cross-section may, instead of being square, be rectangular, circular, polygonal, or elliptical. For example, as shown in FIGS. 28A and 28B, the cross-section of the structural tube 110 may be substantially rectangular shaped (noting that FIG. 28A shows a top perspective view of the structural tube 110 having a rectangular cross-section and FIG. 28B shows a bottom perspective view of the structural tube 110 having the rectangular cross-section). Similarly, as shown in FIGS. 29A and 29B, the cross-section of the structural tube 110 may be substantially circular shaped (noting that FIG. 29A shows a top perspective view of the structural tube 110 having a circular cross-section and FIG. 29B shows a bottom perspective view of the structural tube 110 having the circular cross-section). It should be pointed out that the aforementioned cross-sections of the structural tube are for purposes of illustration only and are not intended to limit the scope of the invention.

In the case where the cross-section of the structural tube 110 is circular, a side of the structural tube 110 may correspond to an arc length which forms the perimeter of the circle. For example, in example embodiments, when a structural tube having a circular cross-section is described as having four (4) sides, each side would correspond to a quarter of the perimeter.

As illustrated in FIGS. 6-8E, the end of the structural tube 110, according to example embodiments, may have various slots. For example, the end of the structural tube 110 may have a first slot S1-112 running along a length of the first side S1, a second slot S2-112 running along a length of the second side S2, a third slot S3-112 running along the third side S3, and a fourth slot S4-112 running along the fourth side S4.

Figure 8B:
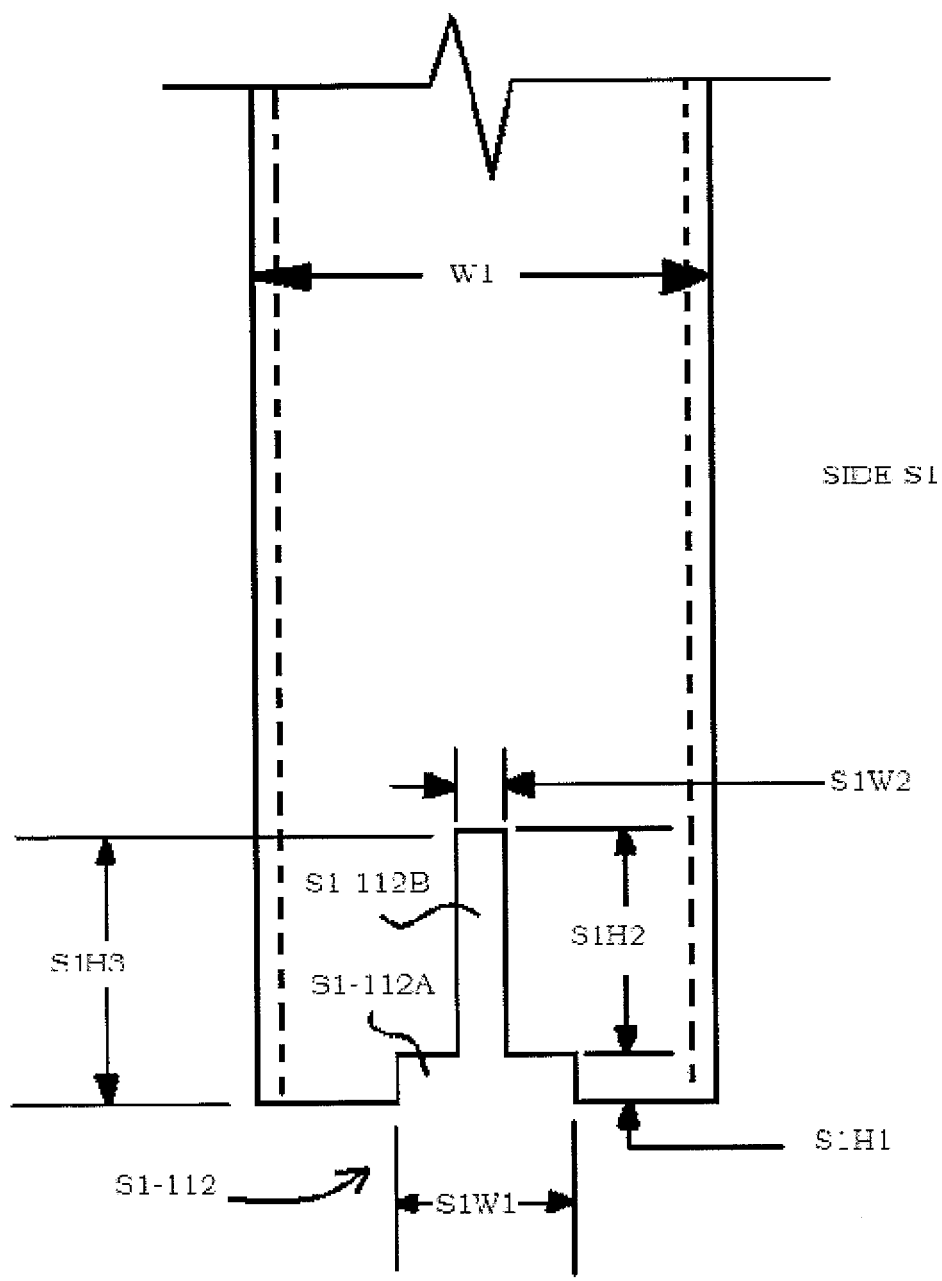
FIGS. 8B-8E are elevation views of the tube member in accordance with example embodiments.

Referring to FIG. 8B, the first slot S1-112 may extend from an end of the structural tube 110 towards a middle of the structural tube 110. In example embodiments, the first slot S1-112 may have different regions with different widths. For example, the first slot S1-112 may include a first region S1-112A and a second region S1-112B which may have different widths. For example, the first region S1-112A may have a first width S1W1 and the second region S1-112B may have a second width S1W2. In example embodiments, the first width S1W1 may be about equal to or larger than the second width S1W2. In addition to having different widths, each region may have different heights. For example, the first region S1-112A may have a first height S1H1 and the second region S1-112B may have a second height S1H2. In example embodiments, the second height S1H2 may be larger than the first height S1H1, however, example embodiments are not limited thereto as the first and second heights S1H1 and S1H2 may be substantially the same or the first height S1H1 may be larger than the second height S1H2.

In example embodiments, the first region S1-112A of the first slot S1-112 may be configured to accommodate a tab of the end plate 170. For example, as shown in FIGS. 6 and 7B, the first region S1-112A of the first slot S1-112 may accommodate a first tab 176 of the end plate 170. Thus, the first width S1W1 of the first region S1-112A of the first slot S1-112 should be wide enough to accommodate the first tab 176 of the end plate 170. The second region S1-112B of the first slot S1-112 may be configured to accommodate a thickness of the first plate 120. For example, as shown in FIGS. 6, 7A, and 7B, the first plate 120 may be inserted into the second region S1-112B of the first slot S1-112. Thus, a width S1W2 of the second region S1-112B of the first slot S1-112 may be substantially the same as, or slightly larger than, a thickness of the first plate 120.

Figure 8C:
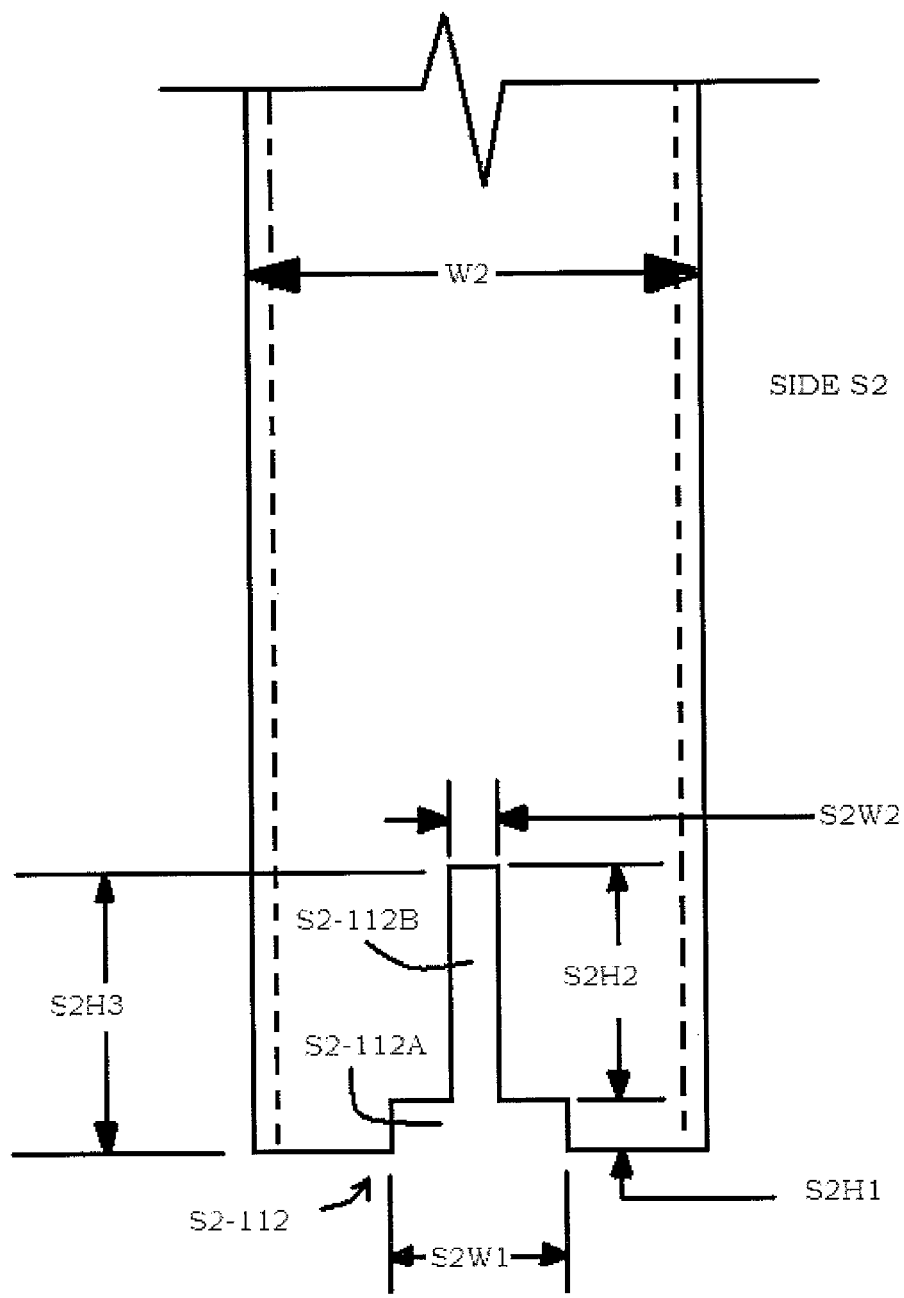

Referring to FIG. 8C, the second slot S2-112 may also extend from the end of the structural tube 110. In example embodiments, the second slot S2-112 may also have different regions with different widths. For example, as shown in FIG. 8C, the second slot S2-112 may include a first region S2-112A and a second region S2-112B which may have different widths. For example, the first region S2-112A of the second slot S2-112 may have a first width S2W1 and the second region S2-112B of the second slot S2-112 may have a second width S2W2. In example embodiments, the first width S2W1 of the first region S2-112A of the second slot S2-112 may be about equal to or larger than the second width S2W2 the second region S2-112B of the second slot S2-112. In addition to having different widths, each region may have different heights. For example, the first region S2-112A of the second slot S2-112 may have a first height S2H1 and the second region S2-112B of the second slot S2-112 may have a second height S2H2. In example embodiments, the second height S2H2 may be larger than the first height S2H1, however, example embodiments are not limited thereto as the first and second heights S2H1 and S2H2 may be substantially the same or the first height S2H1 may be larger than the second height S2H2.

In example embodiments, the first region S2-112A of the second slot S2-112 may be configured to accommodate a tab of the end plate 170. For example, as shown in FIGS. 6 and 7B, the first region S2-112A of the second slot S2-112 may accommodate a second tab 177 of the end plate 170. Thus, a width S2W1 of the first region S2-112A of the second slot S2-112 should be wide enough to accommodate the second tab 177 of the end plate 170. The second region S2-112B of the second slot S2-112 may be configured to accommodate a thickness of the second plate 130. For example, as shown in FIGS. 6, 7A, and 7B, the second plate 130 may be inserted into the second region S2-112B of the second slot S2-112. Thus, a width S2W2 of the second region S2-112B of the second slot S2-112 may be substantially the same as, or slightly larger than, a thickness of the second plate 130.

Figure 8D:
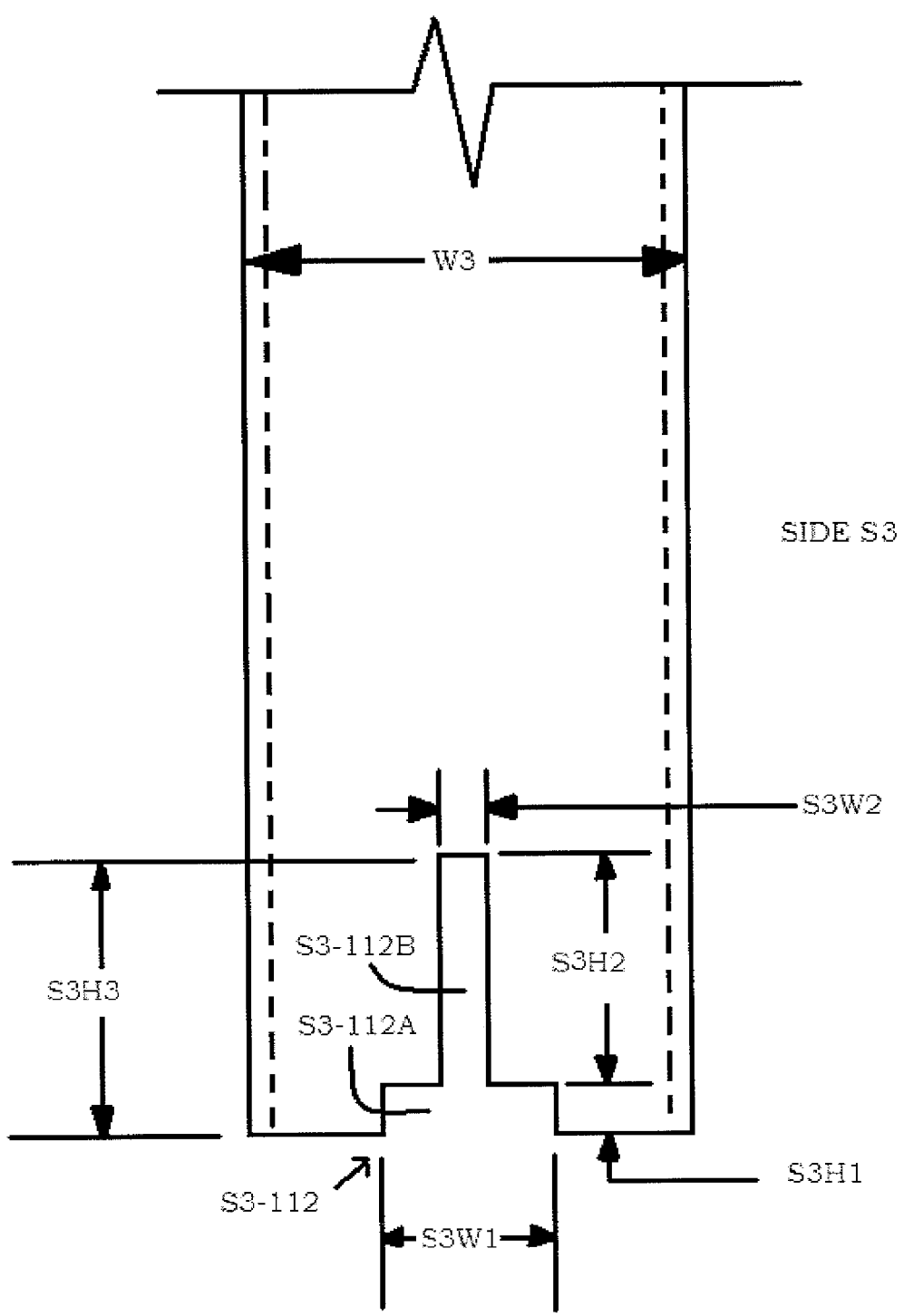

FIG. 8D shows the third side S3 of the structural tube 110 according to example embodiments. In FIG. 8D, the third side S3 may include the third slot S3-112 which may extend from an end of the structural tube 110. In example embodiments, the third slot S3-112 may also have different regions with different widths. For example, as shown in FIG. 8D, the third slot S3-112 may include a first region S3-112A and a second region S3-112B which have different widths. For example, the first region S3-112A of the third slot S3-112 may have a first width S3W1 and the second region S3-112B of the third slot S3-112 may have a second width S3W2. In example embodiments, the first width S3W1 may be about equal to or larger than the second width S3W2. In addition to having different widths, each region may have different heights. For example, the first region S3-112A of the third slot S3-112 may have a first height S3H1 and the second region S3-112B of the third slot S3-112 may have a second height S3H2. In example embodiments, the second height S3H2 may be larger than the first height S3H1, however, example embodiments are not limited thereto as the first and second heights S3H1 and S3H2 may be substantially the same or the first height S3H1 may be larger than the second height S3H2.

In example embodiments, the first region S3-112A of the third slot S3-112 may be configured to accommodate a tab of the end plate 170. For example, as shown in FIGS. 6 and 7B, the first region S3-112A of the third slot S3-112 may accommodate a third tab 178 of the end plate 170. Thus, the width S3W1 of the first region S3-112A of the third slot S3-112 should be wide enough to accommodate the third tab 178. The second region S3-112B of the third slot S3-112 may be configured to accommodate a thickness of the first plate 120. For example, as shown in FIGS. 6, 7A and 7B, the first plate 120 may be inserted into the second region S3-112B of the third slot S3-112. Thus, the width S3W2 of the second region S3-112B of the third slot S3-112 may be substantially the same as, or slightly larger than, a thickness of the first plate 120.

Figure 8E:
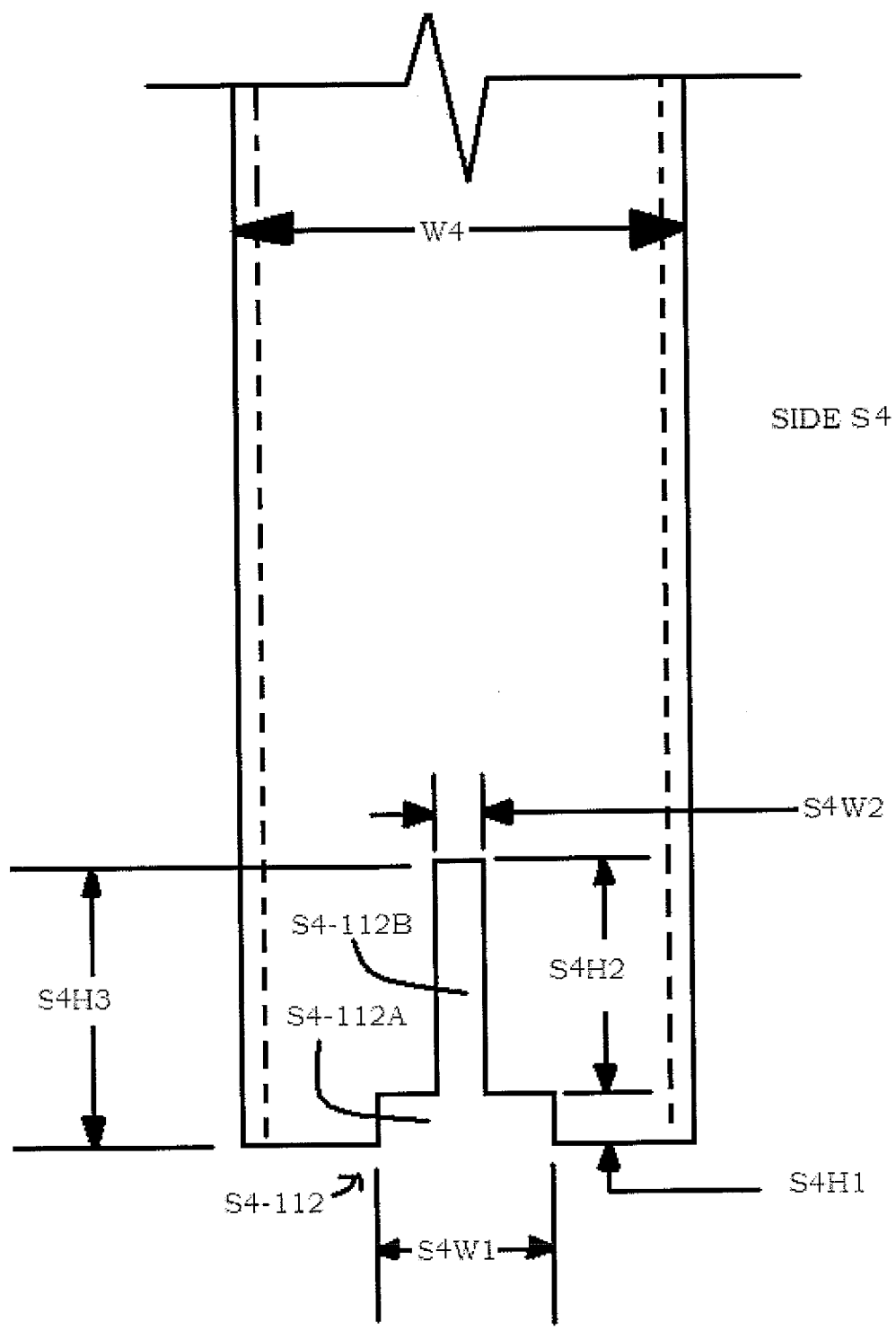

FIG. 8E shows a fourth side S4 of the structural tube 110 according to example embodiments. In FIG. 8E, the fourth side S4 may include the fourth slot S4-112 which may extend from an end of the structural tube 110. In example embodiments, the fourth slot S4-112 may also have different regions with different widths. For example, as shown in FIG. 8E, the fourth slot S4-112 may include a first region S4-112A and a second region S4-112B which may have different widths. For example, the first region S4-112A of the fourth slot S4-112 may have a first width S4W1 and the second region S4-112B of the fourth slot S4-112 may have a second width S4W2. In example embodiments, the first width S4W1 may be about equal to or larger than the second width S4W2. In addition to having different widths, each region may have different heights. For example, the first region S4-112A of the fourth slot S4-112 may have a first height S4H1 and the second region S4-112B of the fourth slot S4-112 may have a second height S4H2. In example embodiments, the second height S4H2 may be larger than the first height S4H1, however, example embodiments are not limited thereto as the first and second heights S4H1 and S4H2 may be substantially the same or the first height S4H1 may be larger than the second height S4H2.

In example embodiments, the first region S4-112A of the fourth slot S4-112 may be configured to accommodate a tab of the end plate 170. For example, as shown in FIGS. 6 and 7B, the first region S4-112A of the fourth slot S4-112 may accommodate a fourth tab 179 of the end plate 170. Thus, a width S4W1 of the first region S4-112A of the fourth slot S4-112 should be wide enough to accommodate the fourth tab 179. The second region S4-112B of the fourth slot S4-112 may be configured to accommodate a thickness of the second plate 130. For example, as shown in FIGS. 6, 7A and 7B, the second plate 130 may be inserted into the second region S4-112B of the fourth slot S4-112. Thus, a width S4W2 of the second region S4-112B of the fourth slot S4-112 may be substantially the same as, or slightly larger than, a thickness of the second plate 130.

As alluded to earlier, a cross-section of the structural tube 110 may be substantially square-shaped. Thus, widths W1, W2, W3, and W4 of the structural tube 110 may be substantially the same. However, in the event the structural tube 110 is rectangular in shape, then widths W1 and W3 of the first and third sides S1 and S3 may be substantially the same and widths W2 and W4 of the second and fourth sides S2 and S4 may be substantially the same but different than the widths W1 and W3 of the first and third sides S1 and S3.

With regard to the first slot S1-112, the second slot S2-112, the third slot S3-112, and the fourth slot S4-112, it is noted that, in example embodiments, each may have the same configuration. For example, each of the first to fourth slots S1-112, S2-112, S3-112, and S4-112 may have an identical configuration regarding the number of regions and the heights and widths of each region. However, example embodiments are not limited thereto. For example, the height S1H3 of the first slot S1-112 may be larger than the height S2H3 of the second slot S2-112, the height S3H3 of third slot S3-112, or the height S4H4 of fourth slot S4-112. As another example, the width S1W1 of the first slot S1-112 may be larger than any of the widths S2W1, S3W1 or S4W1 of the second, third, and fourth slots S2-112, S3-112, and S4-112. Furthermore, pairs of slots may have identical configurations. For example, the first and third slots S1-112 and S3-112 may have an identical configuration and the second and fourth slots S2-112 and S4-112 may likewise have an identical configuration. In addition, although each of the first through fourth slots S1-112, S2-112, S3-112, and S4-112 are shown as comprising two regions, example embodiments are not limited thereto as there could be more or less than two regions associated with each slot. For example, any one of (or all of) the first through fourth slots S1-112, S2-112, S3-112, and S4-112 could have a third region extending from one of their respective second regions S1-112B, S2-112B, S3-112B, and S4-112B. In the alternative, rather than having slots with multiple regions, each of the first through fourth slots S1-112, S2-112, S3-112, and S4-112 could have only a single region extending from the end of the structural tube 110.

Figure 9A:
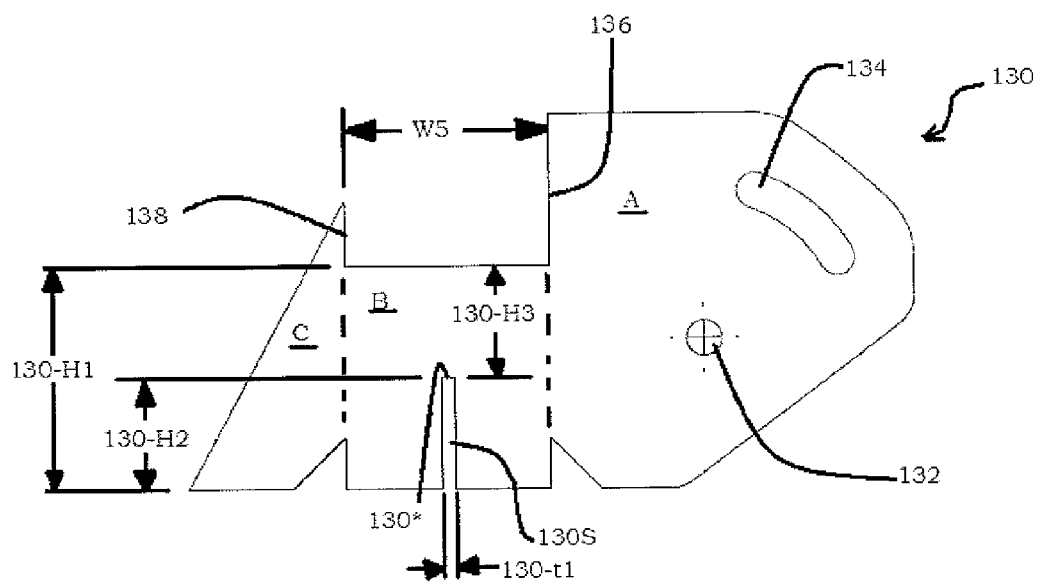
FIGS. 9A-9E are elevation views of cross members in accordance with example embodiments.

FIG. 9A is an elevation view of the second plate 130 shown in FIGS. 6, 7A, and 7B. As shown in FIG. 9A, the second plate 130 may have three portions: A, B, and C. In example embodiments, the first portion A may resemble a gusset plate that includes a first hole 132 and a second hole 134. The first hole 132, for example, may be a circular hole and the second hole 134 may be a slotted semicircular hole with a center of curvature approximately coincident with the center of the first hole 132. The first and second holes 132 and 134 may be configured to allow a bolt to pass therethrough to secure a structural member to the first portion A. The third portion C may resemble a stiffener plate and thus may have a substantially triangular shape. The substantially triangular shape, however, is not intended to limit the invention. For example, rather than having a triangular shape, the third portion C may have a polygonal shape (for example, trapezoidal shape or a rectangular shape), a semicircular shape, or an elliptical shape. The middle portion B, may be a substantially rectangular member having a width W5 and a height 130-H1. In example embodiments, the width W5 of the middle portion B may be substantially the same as the width W1 of the structural tube 110 and the height 130-H1 may be substantially the same as, or smaller than the length S2H2 of the second slot S2-112. In example embodiments, the thickness of the second plate 130 may be about the same as, or slightly smaller than, the width S2W2 of the second region S2-112B of the second slot S2-112.

As shown in FIG. 6, the second plate 130 may be inserted into the second and fourth slots S2-112 and S4-112 of the structural tube 110. When inserted, a first face 136 of the second plate 130 may bear against, or be relatively close to, an outside surface of the structural tube 110 corresponding to the second side S2 of the structural tube 110. In addition, a second face 138 (see FIG. 9A) of the second plate 130 may bear against, or be relatively close to, another outside surface of the structural tube 110 corresponding to the fourth side S4.

Figure 9B:
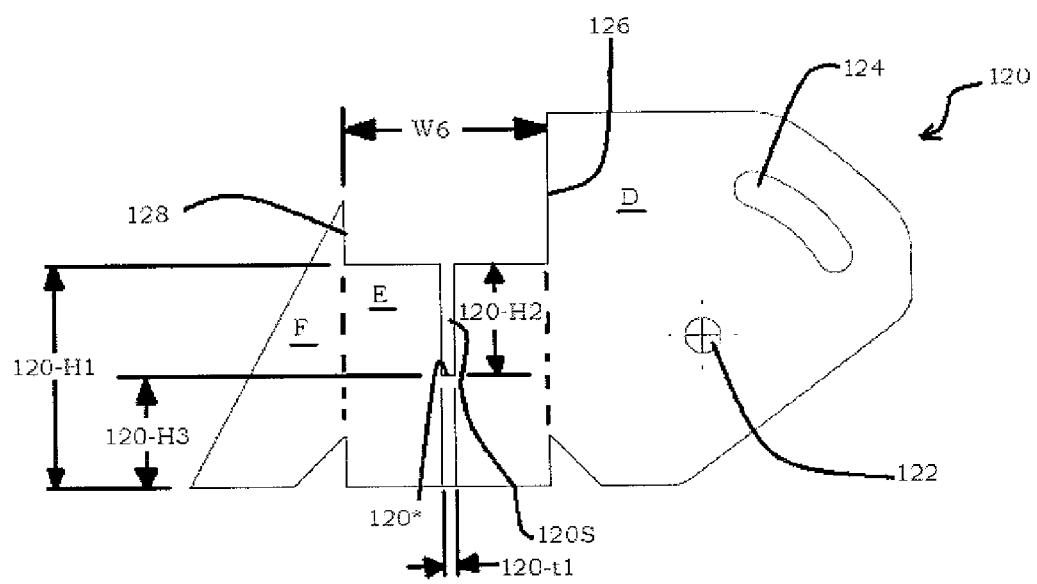

FIG. 9B is an elevation view of the first plate 120 shown in FIGS. 6, 7A, and 7B. As shown in FIG. 9B, the first plate 120 may also have three portions: D, E, and F. In example embodiments, the first portion D may resemble a gusset plate that includes a first hole 122 and a second hole 124. The first hole 122, for example, may be a circular hole and the second hole 124 may be a slotted semicircular hole with a center of curvature approximately coincident with the center of the first hole 122. The first and second holes 122 and 124 may be configured to allow a bolt to pass therethrough to secure a structural member to the first portion D. The third portion F may resemble a stiffener plate and thus may have a triangular shape. The triangular shape, however, is not intended to limit the invention. For example, rather than having a triangular shape, the third portion F may have a polygonal shape (for example, trapezoidal shape), a semi-circular shape, or an elliptical shape. The middle portion E, may be a substantially rectangular member having a width W6 and a height 120-H1. In example embodiments, the width W6 of the middle portion E may be substantially the same as the width W2 of the structural tube 110 and the height 120-H1 may be substantially the same as, or smaller than the length S1H2 of the first slot S1-112. In example embodiments, the thickness of the first plate 120 may be about the same as, or slightly smaller than, the width S1W2 of the second region S1-112B of the first slot S1-112.

As shown in FIG. 6, the first plate 120 may be inserted into the first and third slots S1-112 and S3-112 of the structural tube 110. When inserted, a first face 126 of the first plate 120 may bear against, or be relatively close to, an outside surface of the structural tube 110 corresponding to the first side S1 of the structural tube 110. In addition, a second face 128 of the first plate 120 may bear against, or be relatively close to, another outside surface of the structural tube 110 corresponding to the third side S3.

In addition to the aforementioned features, regions E and B of the first and second plates 120 and 130 may also include slots. For example, as shown in FIG. 9A, region B of the second plate 130 may include a slot 130S extending from a bottom thereof. The slot 130S may have a height 130-H2 and a thickness 130-t1. Similarly, as shown in FIG. 9B, region E of the first plate 120 may include a slot 120S. However, in FIG. 9B, the slot 120S extends from an upper surface of region E and extends downward a distance 120-H2. In example embodiments, the slot 130S may expose a surface 130* which defines an end region of the slot 130S and the slot 120S may expose a surface 120* which may define an end region of the slot 120S. In example embodiments, the slots 130S and 120S may be arranged in regions B and E such when plates 120 and 130 are engaged with each other, as shown in FIGS. 6, 7A, and 7B, the slots 120S and 130S overlap. When properly joined the exposed surfaces 120* and 130* may face or contact one another.

In example embodiments, the length 130-H2 of the slot 130S of the second plate 130 may be substantially equal to or longer than a length 120-H3 which extends from the exposed surface 120* of the first plate 120 to a lower surface of region E of the first plate 120. Additionally, a length 120-H2 of the slot 120S of the first plate 120 may be substantially equal to or longer than a length 130-H3 which extends from the exposed surface 130* of the second plate 130 to an upper surface of region B of the second plate 130. Example embodiments, however, are not limited to the aforementioned geometry in the lengths of the slots 120S and 130S may be longer or short than that just described.

FIGS. 9A and 9B provide examples of plates which are usable with example embodiments. More specifically, the second plate 130 is described as having three portions (A, B, and C) wherein region A may serve as a gusset plate and region C may serve as a stiffener plate. Example embodiments, however, are not limited thereto. For example, region A may, instead of functioning as a gusset plate, simply function as another stiffener plate. Thus, in an alternate embodiment, the second plate 130 may resemble a flat slotted plate having two substantially triangular ends each configured to act as a stiffener plate. Similarly, region C may, in an alternate embodiment, be structured to serve as a gusset plate. Thus, rather than structuring region C to have a substantially triangular member, region C could be structured to resemble region A of FIG. 9A. Thus, in an alternate embodiment, the second plate 130 may resemble a flat slotted plate having two ends that resemble the gusset plate of region A. Similar modifications may be made to the first plate 120.

In addition, rather than providing two slotted plates as provided for in example embodiments, a single cross-shaped member may provided. The cross shaped member would resemble the slotted plates 120 and 130 when they are joined together (i.e. when their exposed faces 120* and 130* face or contact each other).

Figure 9C:
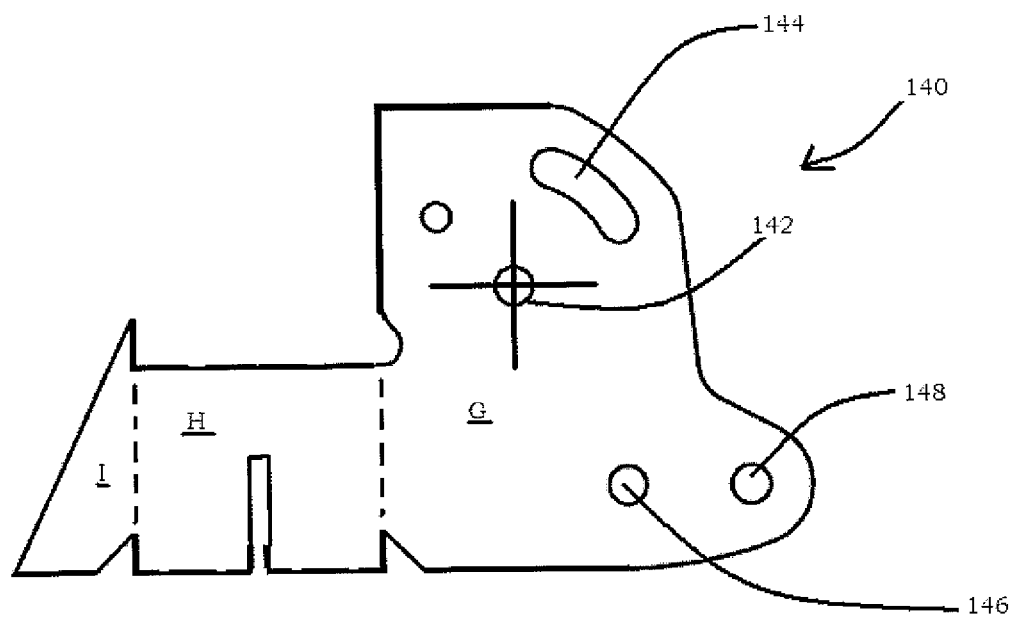

FIG. 9C provides an example of a plate 140 having an alternative configuration. In example embodiments, the plate 140 is similar to the second plate 130 and may be used in lieu of second plate 130. Due to the similarity, and for the sake of brevity, only differences between the alternate plate 140 and the second plate 130 will be emphasized.

FIG. 9C, like FIG. 9A, illustrates a plate 140 which includes three regions: G, H, and I. Plate 140, like the second plate 130, includes a first hole 142 and a second hole 144. Like the second plate 130, the first hole 142 may be a circular hole and the second hole 144 may be a slotted semicircular hole with a center of curvature approximately coincident with the center of the first hole 142. Holes 142 and 144 may allow for a secondary structure, for example, a truss element, to connect to region G of plate 140. However, in addition to the first and second holes 142 and 144, region G of plate 140 includes at least two additional holes 146 and 148. Holes 146 and 148 may allow for an additional structure, for example, another truss element, to connect to region G of plate 140, by a connecting member such as bolt. Example embodiments, however, are not limited by the instant examples since the plate 140 may be further modified to connect to additional secondary members by providing additional holes. In example embodiments, the first plate 120 may be similarly modified.

Figure 9D:
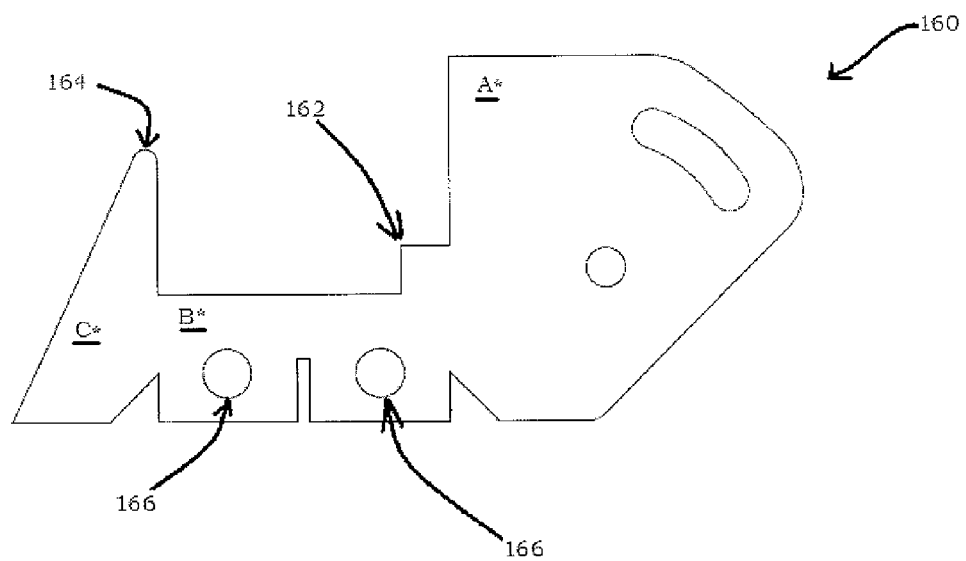
Figure 9E:
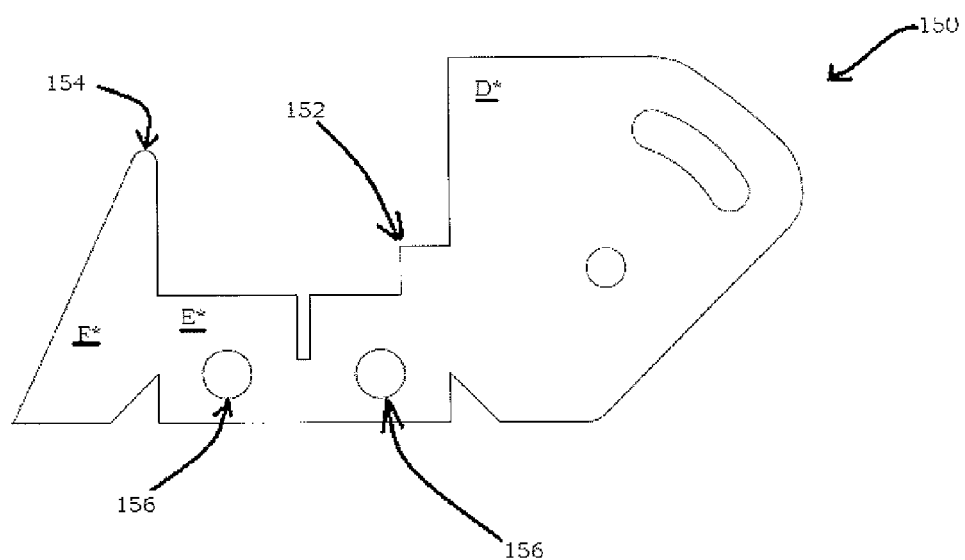

FIGS. 9D-9E provide examples of cross members 160 and 150 having an alternative configuration. In example embodiments, the cross members 160 and 150 are similar to the second plate 130 and the first plate 120, respectively, and may be used in lieu of second plate 130 and the first plate 120. Due to the similarity, and for the sake of brevity, only differences between the alternate plates 160 and 150 and the second plate 130 and the first plate 120 will be emphasized.

FIG. 9D, like FIG. 9A, illustrates a plate 160 which includes three regions: A*, B*, and C*. The first region A* and the third region C* are substantially the same as the first and third regions A and C of the second plate 130, thus a detailed discussion of these regions is omitted for the sake of brevity. In the second plate 130, region B is illustrated as being rectangular, however, in the alternate plate 160, region B* is illustrated as having a stepped configuration. That is, region B* of plate 160 includes a step 162. Although FIG. 9D illustrates the alternative plate 160 as having a single step 162, example embodiments are not limited thereto as there could be more than one step in the second region B*. In addition, rather than having a stepped configuration, the top surface of region B* could be inclined or curved, and with, or without steps. In addition to having a step 162, the alternate plate 160 also includes holes 166 arranged near a bottom thereof.

FIG. 9E, like FIG. 9B, illustrates a plate 150 which includes three regions: D*, E*, and F*. The first region D* and the third region F* are substantially the same as the first and third regions D and F of the first plate 120, thus a detailed discussion of these regions is omitted for the sake of brevity. In the first plate 120, region E is illustrated as being rectangular, however, in the alternate plate 150, region E* is illustrated as having a stepped configuration. That is, region E* of plate 150 includes a step 152. Although FIG. 9E illustrates the alternative plate 150 as having a single step 152, example embodiments are not limited thereto as there could be more than one step in the second region E*. In addition, rather than having a stepped configuration, the top surface of region E* could be inclined or curved, and with, or without steps. In addition to having a step 152, the alternate plate 150 also includes holes 156 arranged near a bottom thereof.

Figure 9F:
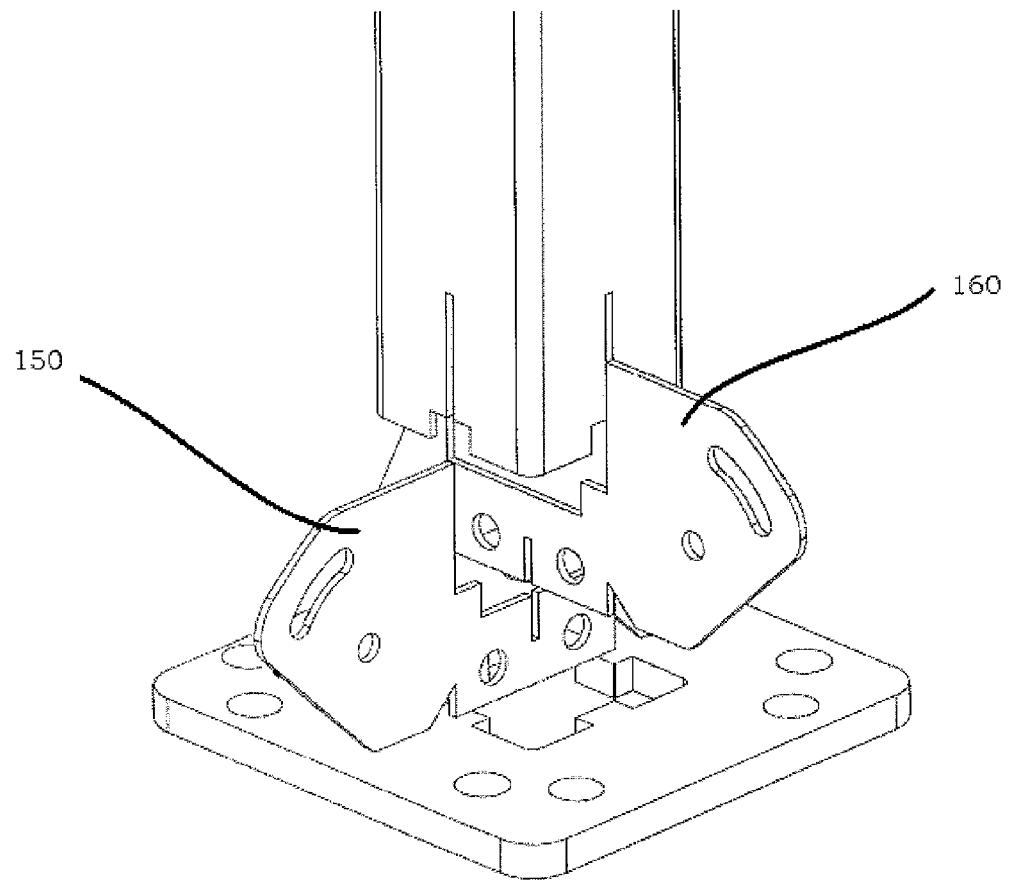
FIG. 9F is a perspective view of an end of a tube member in accordance with example embodiments.

FIG. 9F illustrates an example of how alternate plates 150 and 160 may be employed as cross members at an end of a structural steel tube member. Because this configuration is similar to that shown in FIG. 6, a detailed description thereof is omitted for the sake of brevity. Although the cross members illustrated in FIGS. 9A through 9F are illustrated as having holes, example embodiments are not limited to the number of holes shown or the arrangement thereof. For example, there could be more or less holes than as shown in the figures. In addition, holes are not critical to example embodiments. For example, although holes may be provided for a bolting type connection, example embodiments also allow for a weld type connection. Thus, it is not necessary that the cross members (120, 130, 140, 150, and 160) illustrated in FIGS. 9A through 9F have holes since second members may be welded to these members rather than being bolted thereto.

Figure 10:
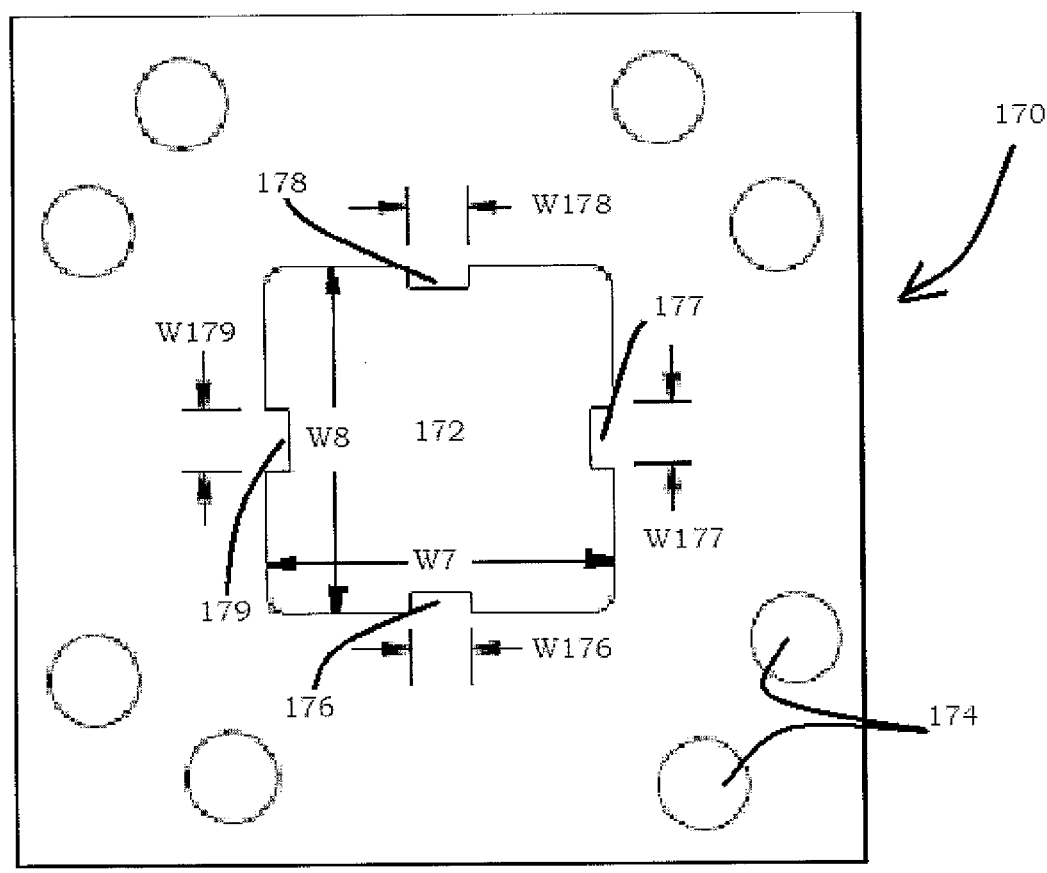
FIG. 10 is a view of an end plate in accordance with example embodiments.

FIG. 10 is a plan view of the end plate 170 in accordance with example embodiments. As shown in FIG. 10, the end plate 170 may have a substantially square outer perimeter, however, example embodiments are not limited thereto. For example, the end plate 170 may have a rectangular, circular, elliptical or octagonal outer perimeter. As another example, the corners of the "square" perimeter may be chamfered thus producing an octagonal perimeter. In example embodiments, holes 174 may be formed near the perimeter of the end plate. For example, as shown in FIG. 10, a pair of holes 174 may be provided near the corners of the substantially square perimeter. Although FIG. 10 shows that the holes are provided in pairs, example embodiments are not limited thereto. For example, rather than providing a pair of holes 174 at the corners of the substantially square perimeter, only a single hole, or more than two holes may be provided. Furthermore, holes may be provided near mid-sides of the perimeter. Further yet, the end plate 170 may be formed without holes since the end plate may be welded, rather than bolted, to a connecting structure.

As illustrated in FIG. 10, a hole 172 may be formed near a center of the end plate 170. The hole 172, for example, may have substantially the same shape as the structural tube 110 which attaches to the end plate 170. For example, when the structural tube 110 is substantially square shaped, the hole 172 may be substantially square shaped. As another example, if the structural tube 110 has a circular cross-section, the hole 172 may be circular. As another example, if the structural tube 110 had a rectangular shape, the hole 172 may have a substantially rectangular shape. In example embodiments, the substantially square shaped hole 172 may have an area defined by the dimensions W7 and W8 wherein, the dimension W7 is substantially the same as, or larger than a width W1 of the first surface S1 of the structural tube 110 (see FIG. 8A) and the dimension W8 is substantially the same as or larger than the width S2 of the second surface S2 of the structural tube 110.

As shown in FIG. 10, tabs may be formed to protrude from a perimeter defining the hole 172. For example, FIG. 10 shows a first tab 176, a second tab 177, a third tab 178, and a fourth tab 179 protruding into the hole 172. The first through fourth tabs 176, 177, 178, and 179 may respectively have widths W176, W177, W178, and W179 which may or may not be the same. In example embodiments, the tabs associated with the end plate 170 are configured to interface with slots formed at the end of the structural tube 110. For example, when assembled, the first tab 176 may be inserted in to the first slot S1-112, the second tab may be inserted into the second slot S2-112, the third tab 178 may be inserted into the third slot S3-112, and the fourth tab 179 may be inserted in to the fourth tab S4-112.

In order to ensure proper fit up, the widths of the slots in the structural tube 110 should be substantially the same as or larger than the widths of the tabs inserted into the slots. Thus, in example embodiments the widths S1W1, S2W1, S3W1, and S4W1 should be substantially the same as, or larger than the widths W176, W177, W178, and W179, respectively.

In example embodiments, as shown in FIG. 6, after the first and second plates 120 and 130 and the end plate 170 are inserted into the slots S1-112, S2-112, S3-112, and S4-112 formed at the end of the structural tube 110, the end plate 110 may be welded to the structural tube 110 to secure the structural tube 110 to the end plate 170. Following this operation, the first and second plates 120 and 130 may be welded to both the structural tube 110 and to the end plate 170 to form the relatively strong and compact structure 100. Although the welding operations provided above offer some sort of order, the order of welding is not critical to example embodiments. For example, rather than welding the end plate 170 to the structural tube 110 as an initial welding operation, one of the first and second plate 120 and 130 may be initially welded to one of the structural tube 110 and the end plate 170. In addition, welding operations may also be performed simultaneously so that the end plate 170 and the first and second plates 120 and 130 may be welded to the structural tube 110 at the same time. As another example, the first and second plates 120 and 130 may be initially welded to each other and then inserted into the slots of the structural tube 110 where they are subsequently welded to the structural tube 110. After the first and second plates 120 and 130 are welded to each other and then to the structural tube 110, the end plate 170 may be welded to the end of the structural tube 110 and the first and second plates 120 and 130. As yet another example the first and second plates 120 and 130 may be welded to each other and then welded to the end plate 170, then the structure comprising the first and second plates 120 and 130 and the end plate 170 may be inserted into the end of the structural tube 110 where the first and second plates 120 and 130 and the end plate 170 may be welded to the structural tube 110.

Figure 11:
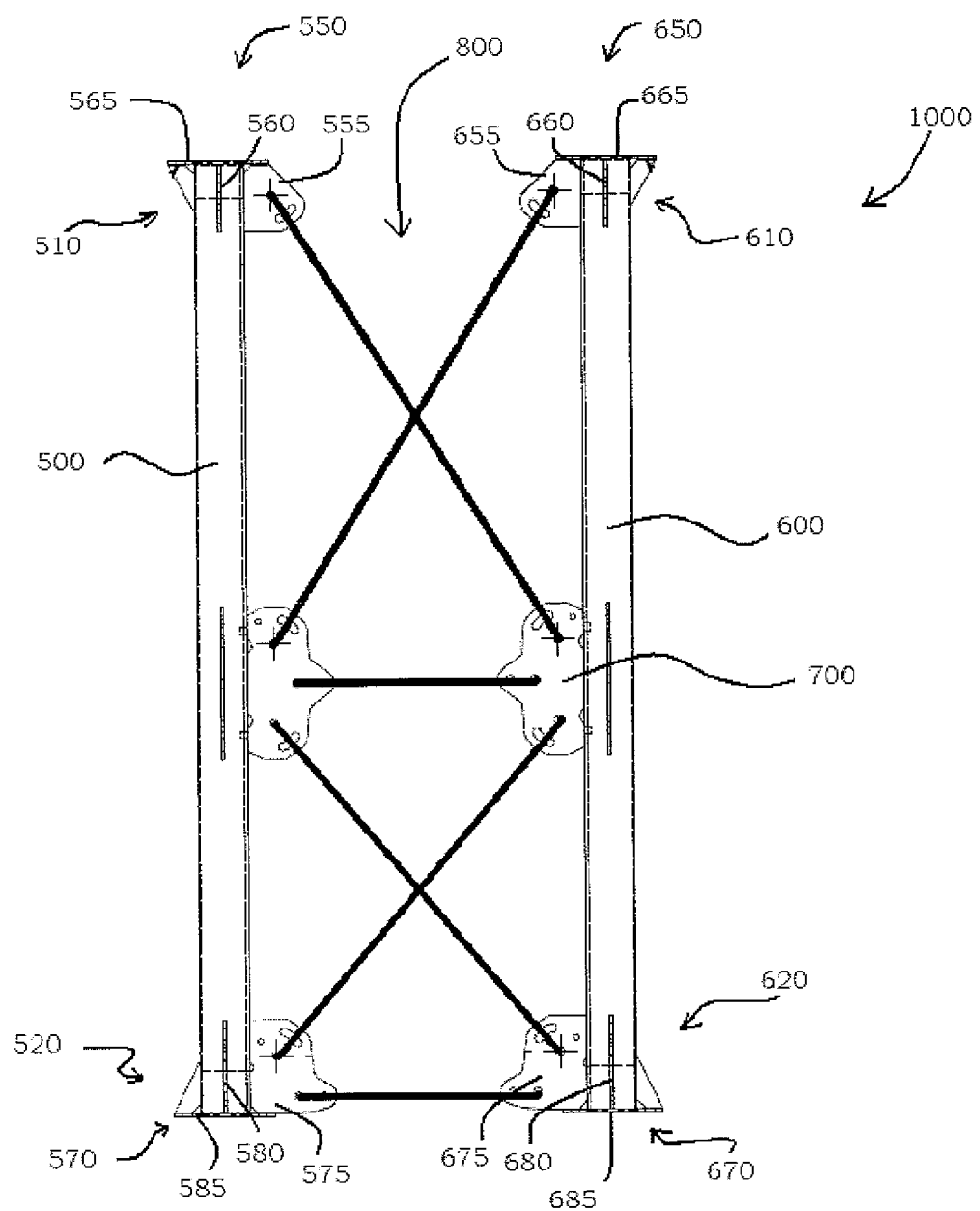
FIG. 11 is a view of a system in accordance with example embodiments.

FIG. 11 illustrates a system 1000 according to example embodiments. In FIG. 11, the system includes a first column 500 and a second column 600 connected by a series of truss elements 800 (for example, angle iron, channel iron, or the like). Though the truss elements 800 are described as being made of iron, example embodiments are not limited thereto as the truss elements 800 may be comprised of other materials such as aluminum, steel, or a metal alloy.

In FIG. 11, the first column 500 includes a first end 510 and a second end 520, each of which may be slotted in a manner similar to that illustrated in FIGS. 8A-8E. At the first end 510, a structure 550 similar to structure 100 may be provided. For example, in example embodiments, the structure 550 may include a first plate 555, a second plate 560, and an end plate 565 which may be substantially identical to the first plate 120, the second plate 130, and the end plate 170. At the second end 520, a structure 570 similar to structure 100 may also be provided. For example, in example embodiments, the structure 570 may include a first plate 575, a second plate 580, and an end plate 585 which may be substantially identical to the first plate 120, the plate 140, and the end plate 170.

In FIG. 11, the second column 600 includes a first end 610 and a second end 620, each of which may be slotted in a manner similar to that illustrated in FIGS. 8A-8E. At the first end 610, a structure 650 similar to structure 100 may be provided. For example, in example embodiments, the structure 650 may include a first plate 655, a second plate 660, and an end plate 665 which may be substantially identical to the first plate 120, the second plate 130, and the end plate 170. At the second end 620, a structure 670 similar to structure 100 may also be provided. For example, in example embodiments, the structure 670 may include a first plate 675, a second plate 680, and an end plate 685 which may be substantially identical to the first plate 120, the plate 140, and the end plate 170.

In FIG. 11, additional plates 700 may be provided along a length of the columns. The additional 700 plates may include protrusions which penetrate slots provided in the columns 500 and 600. The additional plates 700 may be provided to secure additional truss elements 800 to the system 1000 for additional stability.

Figure 12:
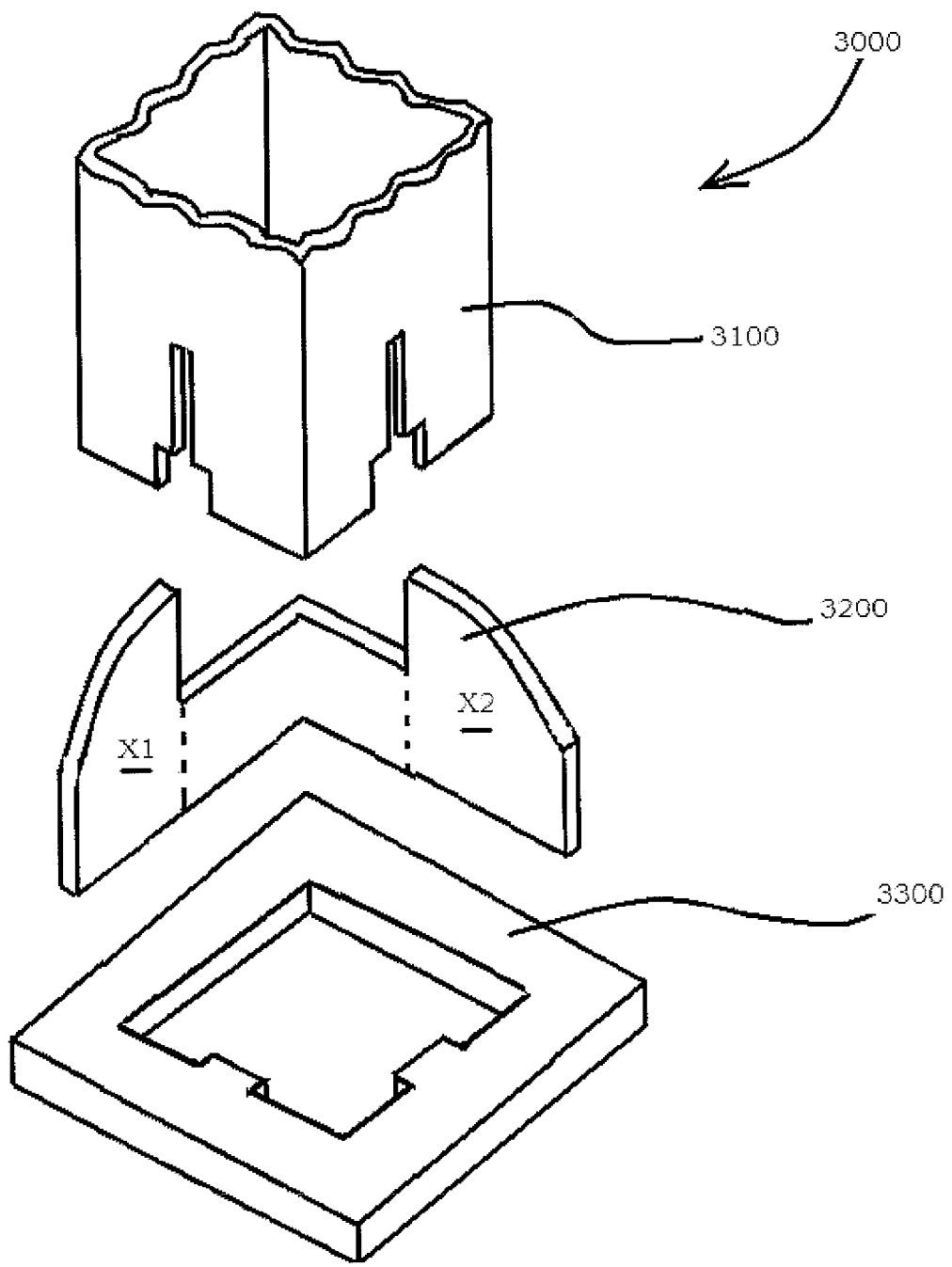
FIG. 12 is an exploded view of a structure in accordance with example embodiments.
Figure 13:
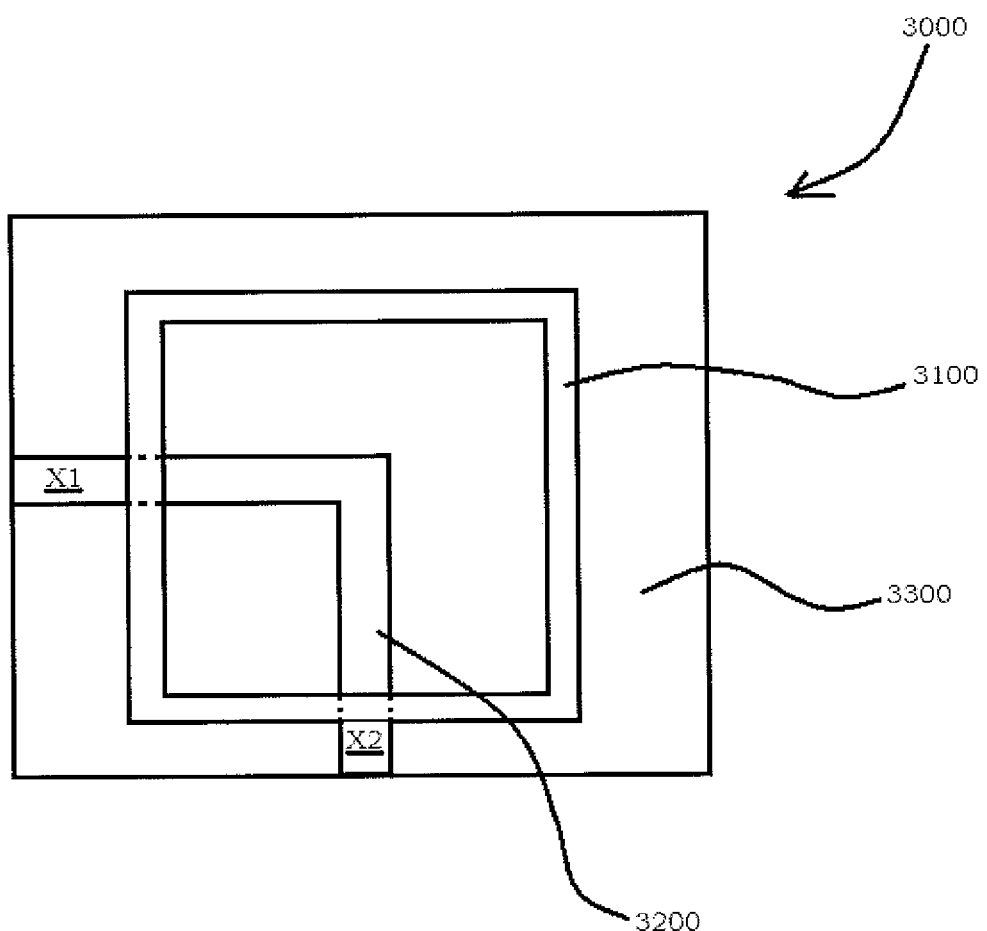
FIG. 13 is a cross-section of a structure in accordance with example embodiments.

FIG. 12 illustrates an exploded view of a structure 3000 in accordance with example embodiments. The structure 3000 of FIG. 12 is similar to that of structure 100, thus, only the differences will be emphasized for the sake of brevity. As shown in FIG. 12, the structure 3000 comprises a structural tube 3100, an L-shaped cross member 3200, and an end plate 3300. In the structure 100, two cross members (members 120 and 130) are provided which span the width of the structural tube 100. However, in FIG. 12, the cross member 3200 does not span an entire width of its corresponding structural tube 3100. Rather, in FIG. 12, the cross member 3200 is formed to have an angle of about ninety degrees. Thus, in FIG. 12, the structure 3000 may be characterized in having a cross member 3200 attached to only two outside surfaces of the structural tube 3100 and the end plate 3300. In FIG. 12, regions X1 and X2 represent generic regions which may be formed either as gusset plates similar to region A of FIG. 9A or region G of FIG. 9C or as stiffeners similar to region C of FIG. 9A. FIG. 13 is a cross-section of FIG. 12 showing that the cross member 3200 does not span the width of the structural tube 3100.

Figure 14:
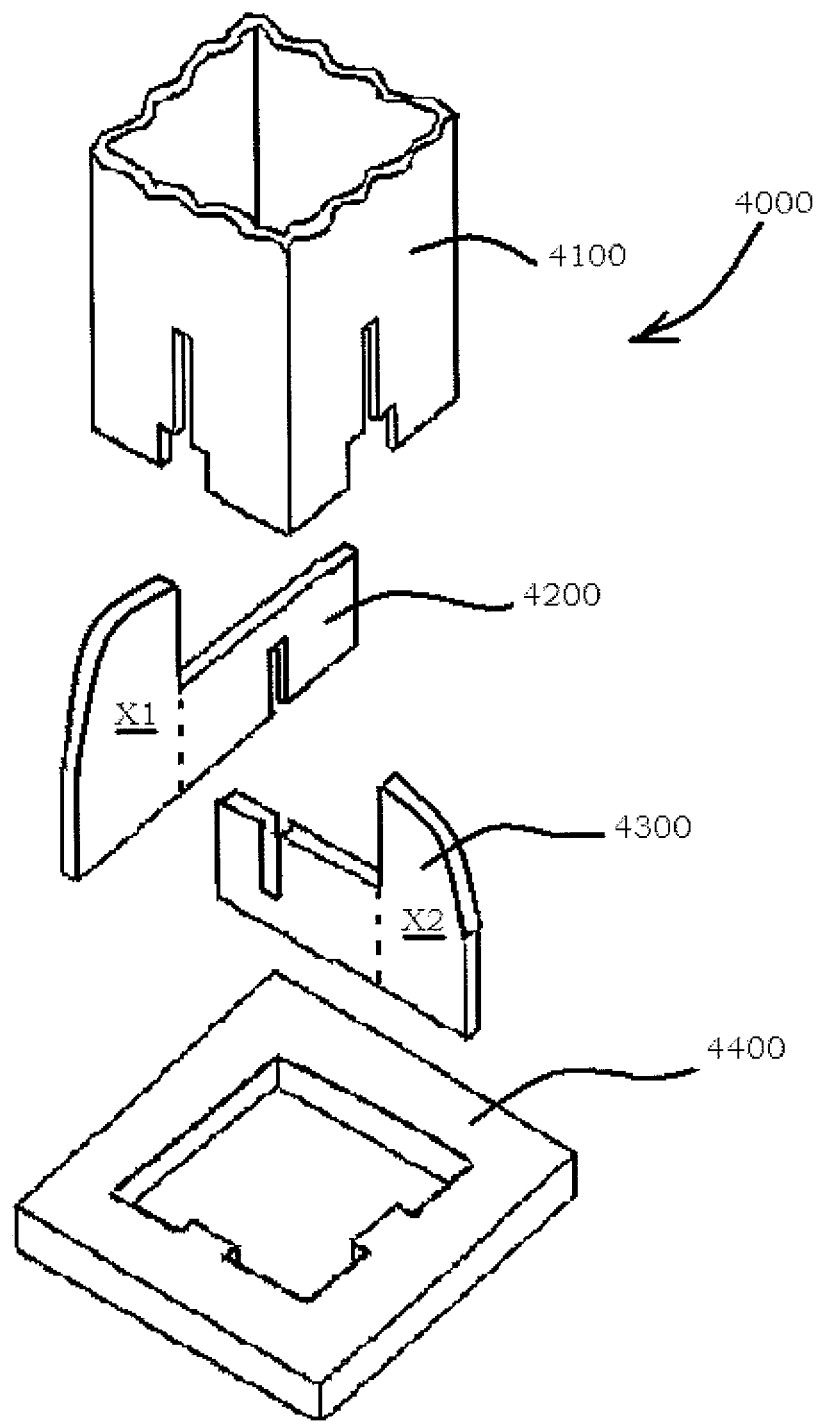
FIG. 14 is an exploded view of a structure in accordance with example embodiments.
Figure 15:
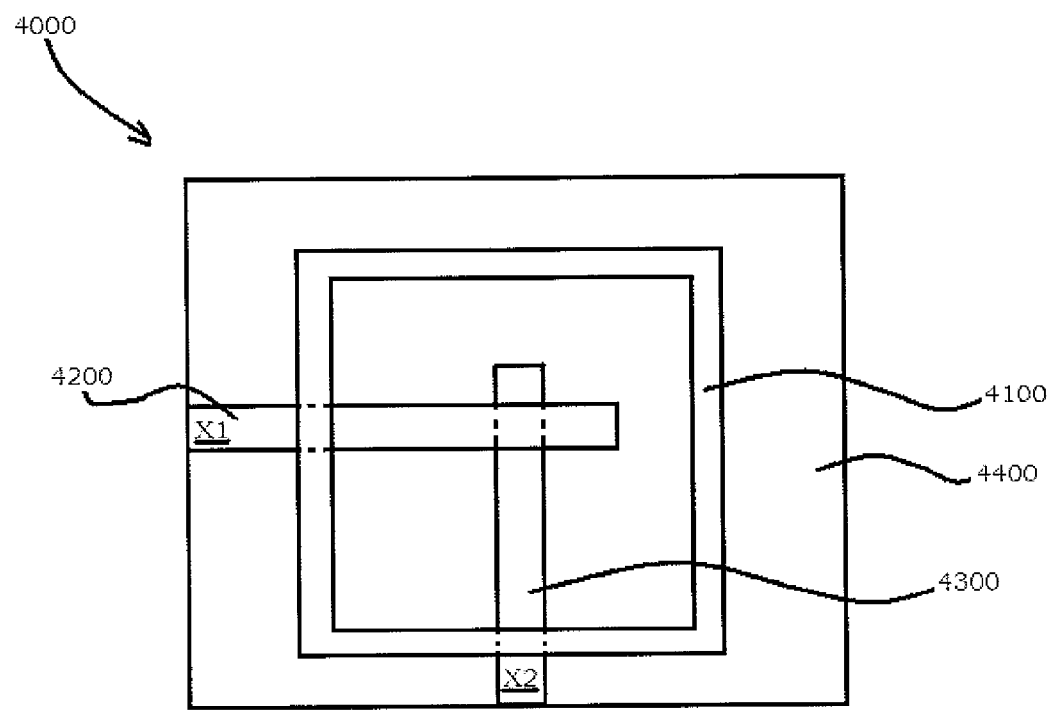
FIG. 15 is a cross-section of a structure in accordance with example embodiments.

FIG. 14 illustrates an exploded view of a structure 4000 in accordance with example embodiments. The structure 4000 of FIG. 14 is similar to that of structure 100, thus, only the differences will be emphasized for the sake of brevity. As shown in FIG. 14, the structure 4000 comprises a structural tube 4100, a first cross member 4200, a second cross member 4300, and an end plate 4400. In the structure 100, two cross members (members 120 and 130) are provided which span the width of the structural tube 100. However, in FIG. 14, the cross members 4200 and 4300 do not span an entire width of its corresponding structural tube 4100. Rather, in FIG. 14, the cross members 4200 and 4300 are connected to have an angle of about ninety degrees. Thus, in FIG. 14, the structure 4000 may be characterized in having cross members 4200 and 4300 attached to only two outside surfaces of the structural tube 4100 and the end plate 4400. In FIG. 14, regions X1 and X2 represent generic regions which may be formed either as gusset plates similar to region A of FIG. 9A or region G of FIG. 9C or as stiffeners similar to region C of FIG. 9A. FIG. 15 is a cross-section of FIG. 14 showing that the cross members 4200 and 4300 do not span the width of the structural tube 4100.

Figure 16:
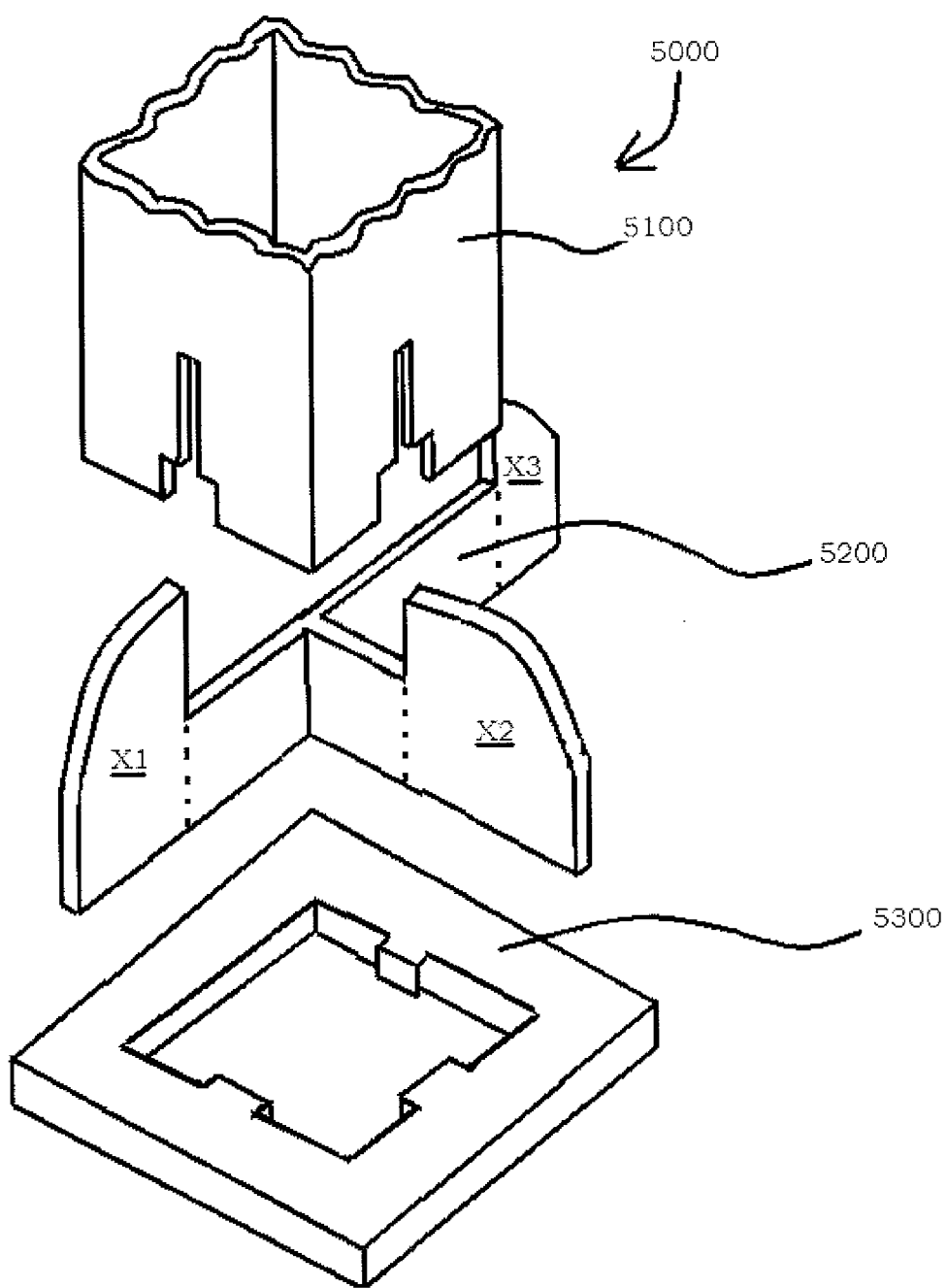
FIG. 16 is an exploded view of a structure in accordance with example embodiments.
Figure 17:
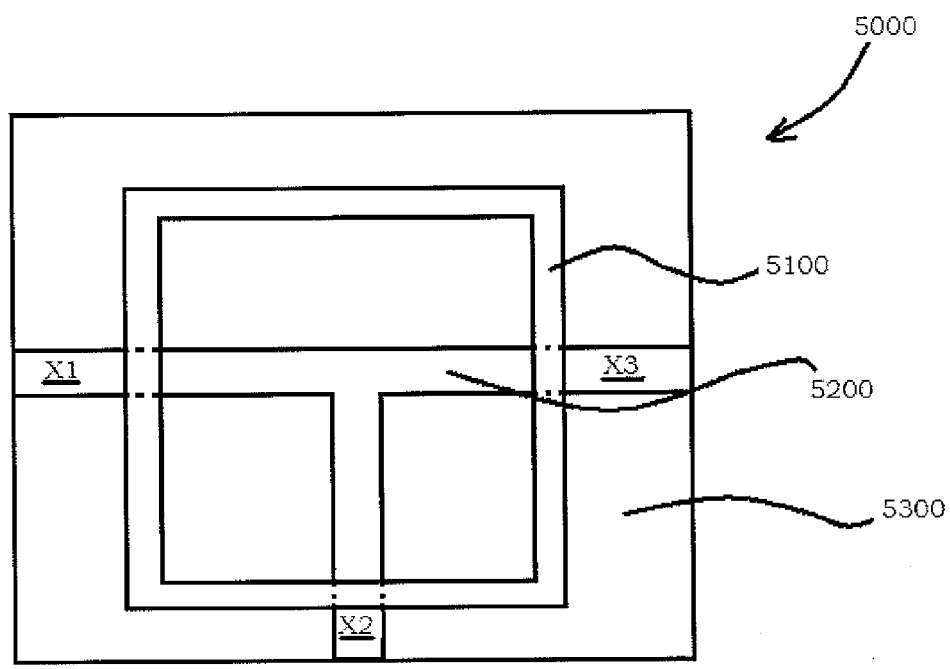
FIG. 17 is a cross-section of a structure in accordance with example embodiments.

FIG. 16 illustrates an example of a structure 5000 in accordance with example embodiments. The structure 5000 of FIG. 16 is similar to that of structure 100, thus, only the differences will be emphasized for the sake of brevity. As shown in FIG. 16, the structure 5000 comprises a structural tube 5100, a T-shaped cross member 5200, and an end plate 5300. In the structure 100, two cross members (plates 120 and 130) are provided which span the width of the structural tube 100. However, in FIG. 16, the cross member 5200 spans a width of its corresponding structural tube 5100 in only one direction. Thus, in FIG. 16, the structure 5000 may be characterized in having a cross member 5200 attached to only three outside surfaces of the structural tube 5100 and the end plate 5300. In FIG. 16, regions X1, X2, and X3 represent generic regions which may be formed either as gusset plates similar to region A of FIG. 9A or region G of FIG. 9C or as stiffeners similar to region C of FIG. 9A. FIG. 17 is a cross-section of FIG. 16 showing that the cross member 5200 spans the width of the structural tube 5100 in only one direction.

Figure 18:
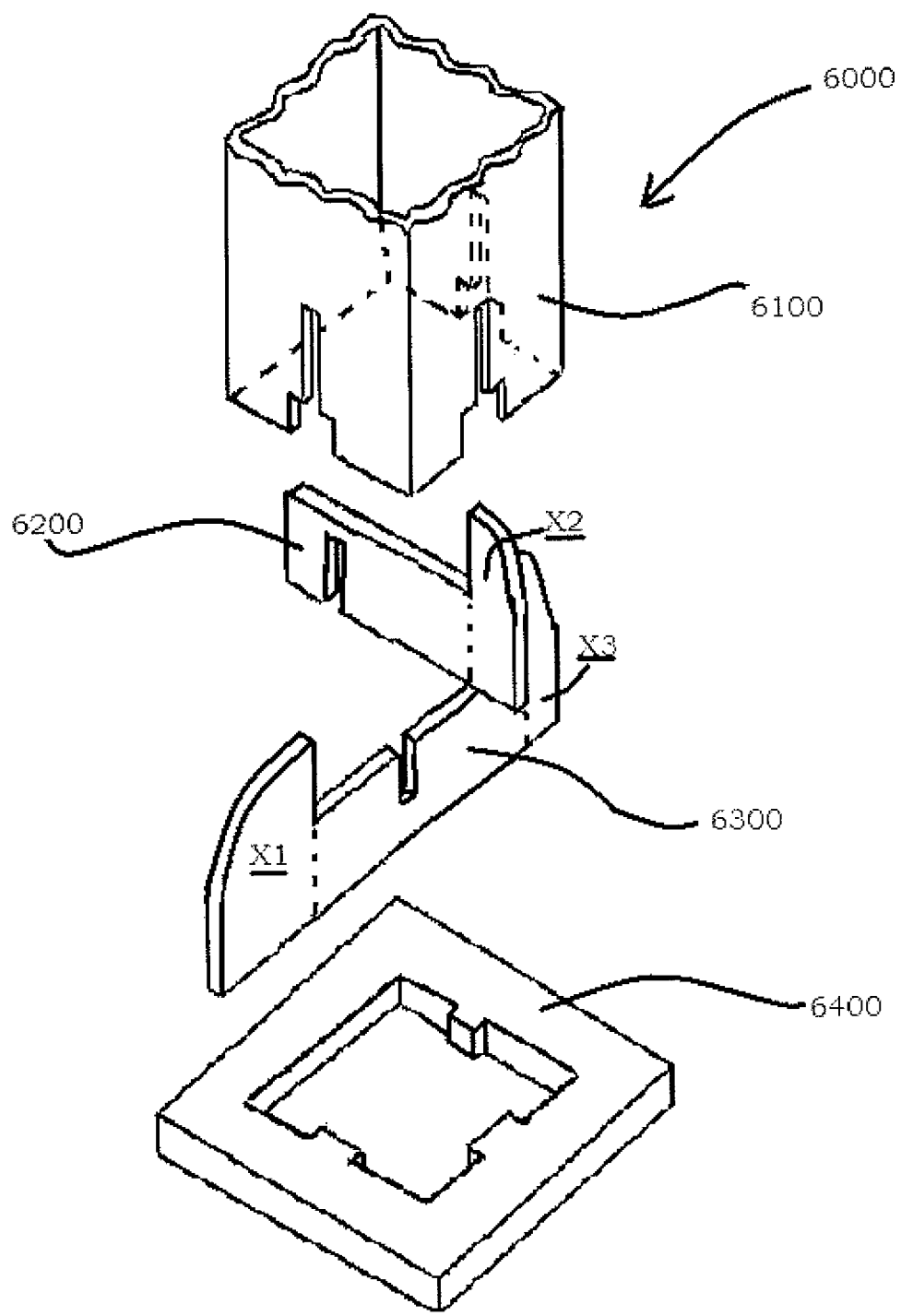
FIG. 18 is an exploded view of a structure in accordance with example embodiments.
Figure 19:
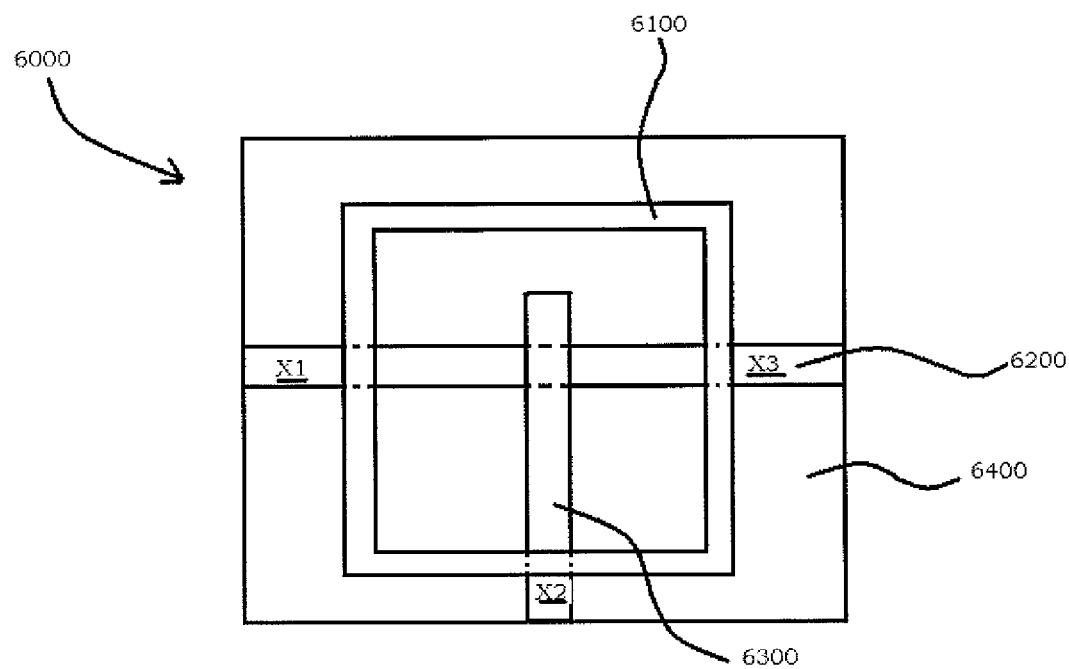
FIG. 19 is a cross-section of a structure in accordance with example embodiments.

FIG. 18 illustrates an example of a structure 6000 in accordance with example embodiments. The structure 6000 of FIG. 18 is similar to that of structure 100, thus, only the differences will be emphasized for the sake of brevity. As shown in FIG. 18, the structure 6000 comprises a structural tube 6100, a first cross member 6200, a second cross member 6300, and an end plate 6400. In the structure 100, two cross members (plates 120 and 130) are provided which span the width of the structural tube 100. However, in FIG. 18, only the cross member 6300 spans an entire width of its corresponding structural tube 6100. Thus, in FIG. 18, the structure 6000 may be characterized in having plates attached to only three outside surfaces of the structural tube 6100. In FIG. 18, regions X1, X2, and X3 represent generic regions which may be formed either as gusset plates similar to region A of FIG. 9A or region G of FIG. 9C or as stiffeners similar to region C of FIG. 9A. FIG. 19 is a cross-section of FIG. 18 showing that the cross members 6200 does not span the width of the structural tube 6100.

Figure 20:
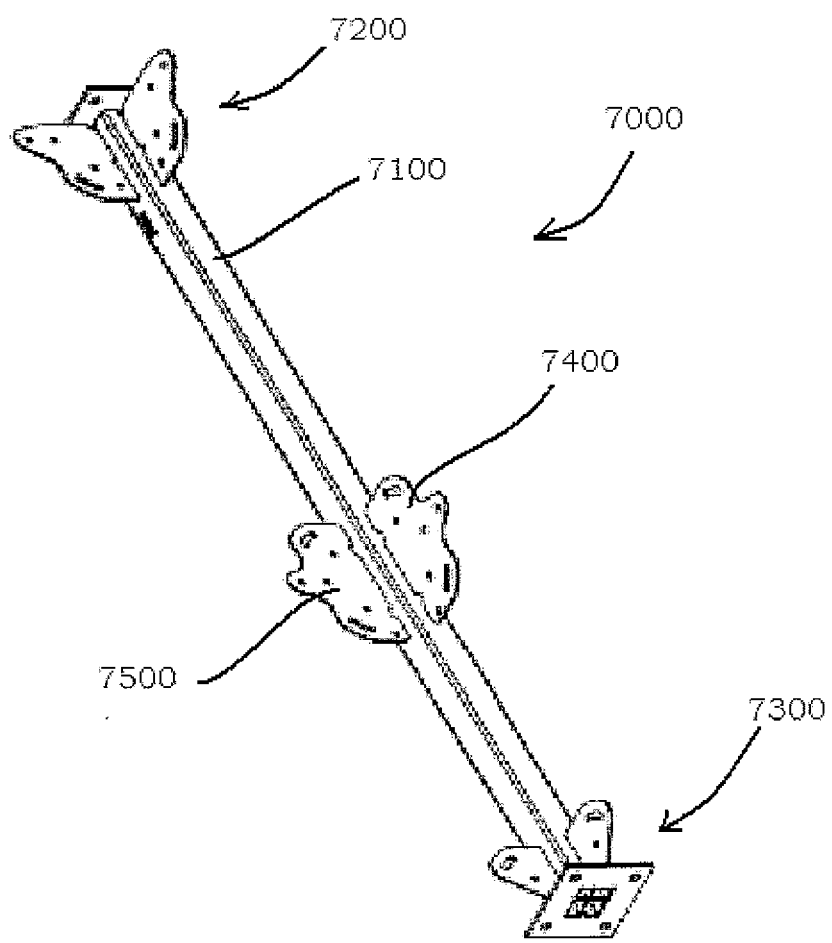
FIG. 20 is a view of a system in accordance with example embodiments.

FIG. 20 is another example of a system 7000 in accordance with example embodiments. The system 7000 illustrated in FIG. 20 may be similar to either the first column 500 or the second column 600 of the system 1000 illustrated in FIG. 11, For example, the system 7000 may include a column-like member 7100 that has a first structure 7200 at a first end of the column-like member 7100 and a second structure 7300 at a second end of the column-like member 7100. The column-like member 7100 may be constructed from tube steel having a square, rectangular, circular, elliptical, or polygonal cross-section. In example embodiments, the first structure 7200 may be similar to the structure 570 illustrated in FIG. 11, thus, a detailed description of the first structure 7200 is not provided for the sake of brevity. Similarly, the second structure 7300 of the system 7000 may be similar to the structure 550 of system 1000. Thus, a detailed description of the second structure 7300 is not provided for the sake of brevity. In example embodiments, while the first structure 7200 and the second structure 7300 may be similar to structures 550 and 570, example embodiments are not limited thereto. For example, the first and second structures 7200 and 7300 may be conventional structures, for example, that shown in FIGS. 1-5, which may be found on ends of conventional columns.

In example embodiments, a set of middle connecting members 7400 and 7500 may be provided along the column-like member 7100. The middle connecting members 7400 and 7500 may be arranged anywhere along a length of the column-like member 7100 and located on any side or face of that member and may be used to attach a structure, for example, angle iron, to the column-like member 7100. Thus, the middle connecting members 7400 and 7500 may act as gusset plates. In example embodiments, the middle connecting members 7400 may be fabricated from a metal plate, however, example embodiments are not limited thereto as the middle connecting members 7400 and 7500 may be made from a material other than metal. For example, the middle connecting members 7400 and 7500 may be made from wood, plastic, or a composite material. Furthermore, the middle connecting members 7400 and 7500 do not necessarily have to be constructed from a plate since the middle connecting members may be fabricated from another structure such as angle iron.

Figure 21:
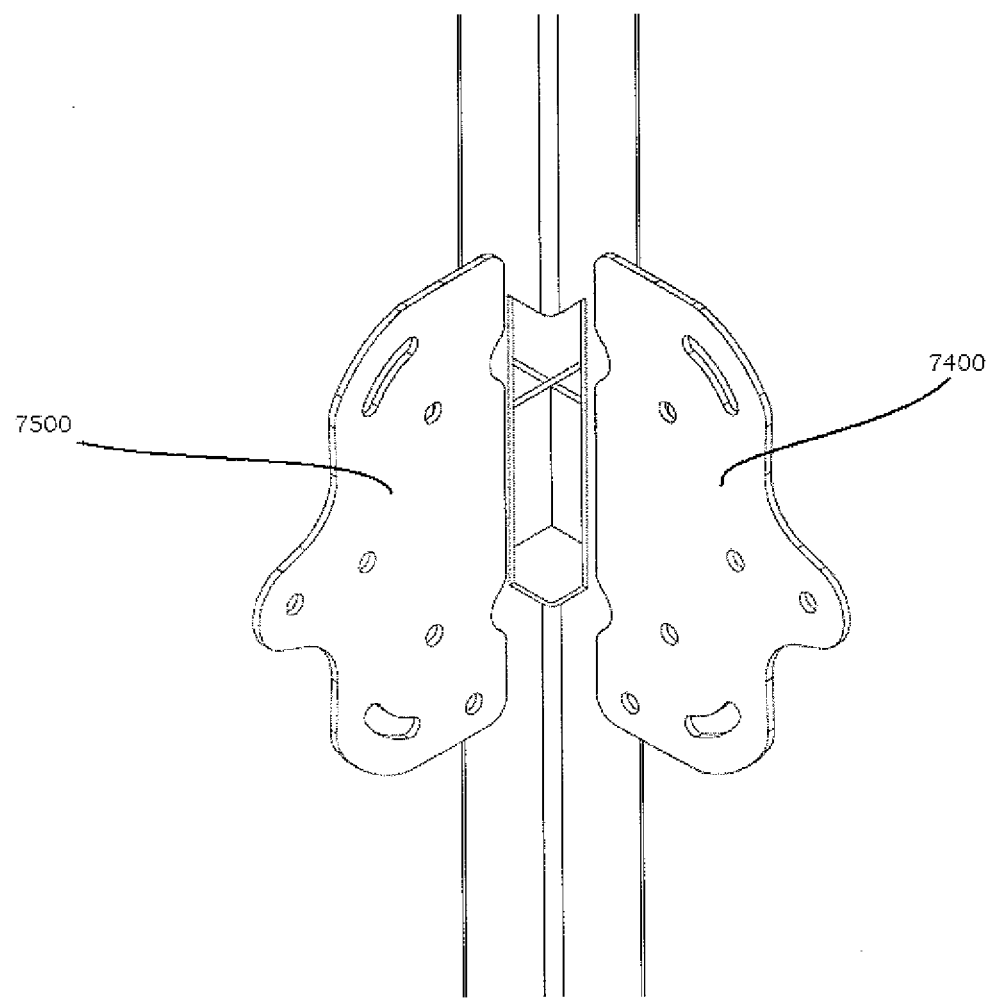
FIG. 21 is a close up view of a the system in accordance with example embodiments.

FIG. 21 illustrates a close up view of the middle connecting members 7400 and 7500 that are attached to the column-like member 7100. In FIG. 21, a portion of the column-like member 7100 is cut away to show the interaction between the first middle connecting member 7400 and the second middle connecting member 7500.

Figure 22:
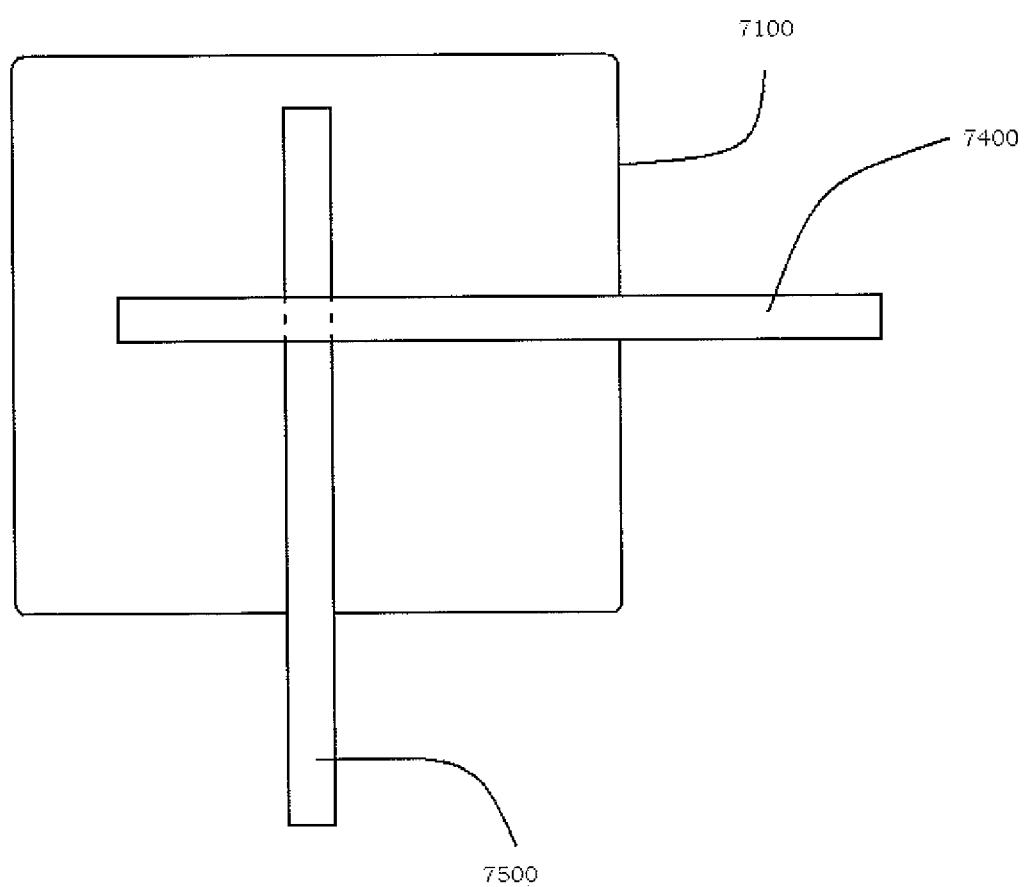
FIG. 22 is a cross-section of the system in accordance with example embodiments.

FIG. 22 is a cross-section view of the column-like member 7100 showing the first and second middle connecting members 7400 and 7500 penetrating the column like member 7100. FIG. 22 shows a portion of the first middle connecting member 7400 overlaps a portion of the second middle connecting member 7500. The overlap may be achieved through the use of slits provided in the first and second middle connecting members 7400 and 7500.

Figure 23:
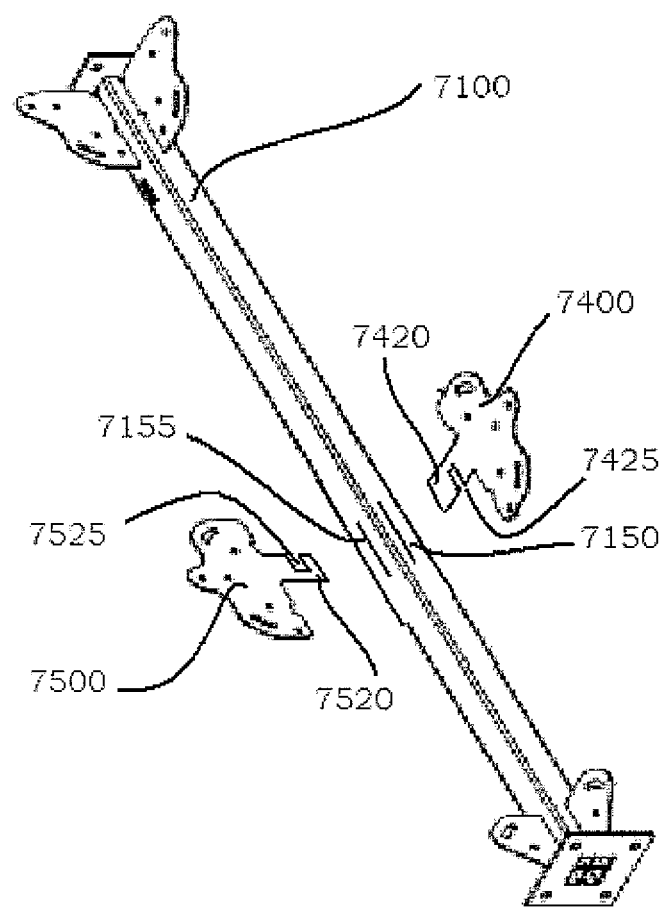
FIG. 23 is a partially exploded view of the system in accordance with example embodiments.

FIG. 23 is a partially exploded view of the system 7000 showing the first and second middle connecting members 7400 and 7500 separated from the column like member 7100. As shown in FIG. 23, the column like member 7100 includes a first slit 7150 that allows a portion 7420 of the first middle connecting member 7400 to pass therethrough. The portion 7420 of the first middle connection member 7400 includes a slit 7425 that may be usable for connecting the first middle connection member 7400 to the second middle connection member 7500. FIG. 23 also shows that the column like member 7100 includes a second slit 7155 that allows a portion 7520 of the second middle connection member 7500 to penetrate the column like member 7100. As shown in FIG. 23, the portion 7520 of the second connection member 7500 may include a slit 7525 that may be usable for connecting the second middle connection member 7500 to the first middle connecting member 7400.

In example embodiments, the second middle connecting member 7500 may be inserted into the second slit 7155. Subsequently, the first middle connecting member 7400 may be inserted into the first slit 7150 and moved towards the second middle connecting member 7500 so that the slots 7425 and the 7525 intersect each other allowing the first and second middle connecting members 7400 and 7500 to interlock with one another. After the first and second middle connecting members 7400 and 7500 are interlocked, the first and second middle connecting members 7400 and 7500 may be welded to the column like member 7100.

Although the above method describes a particular order for attaching the first and second middle connecting members 7400 and 7500 to the column like member 7100, example embodiments are not limited thereto. For example, in example embodiments, the second middle connecting member 7500 may be inserted into the second slit 7155 and then welded to the column like member 7100. Subsequently, the first middle connecting member 7400 may be inserted into the first slit and moved towards the second middle connecting member 7500 so that the slots 7425 and the 7525 intersect each other allowing the first and second middle connecting members 7400 and 7500 to be interlocked with one another. Subsequently, the first middle connecting member 7400 may be welded to the column like member 7100. As yet another example, the first and second middle connecting members 7400 and 7500 may be simultaneously inserted into the first and second slits 7150 and 7155 and then moved towards each other so that the slots 7525 and 7425 overlap one another thus locking the first and second middle connecting members 7400 and 7500 together. Subsequently, the first and second middle connecting members 7400 and 7500 are welded to the column like member 7100.

Figure 24A:
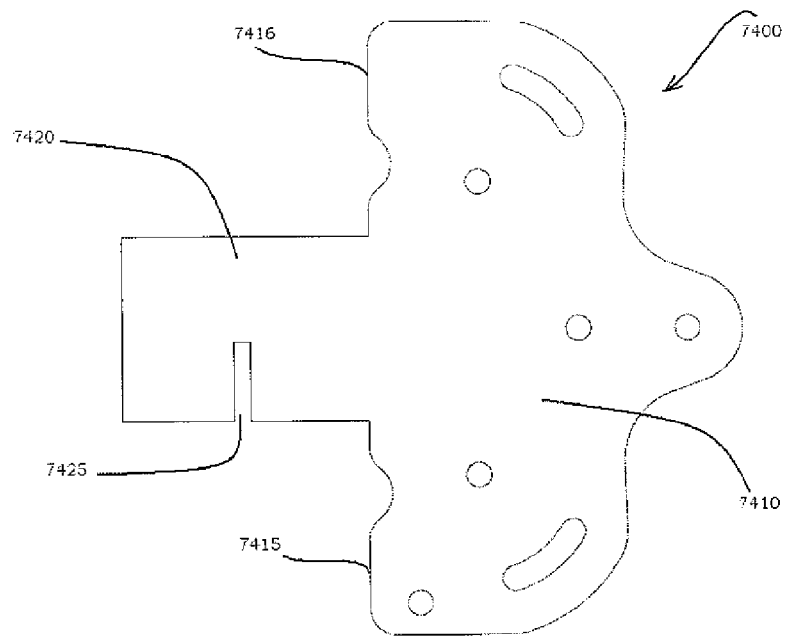
FIGS. 24A and 24B are views of a middle plate in accordance with example embodiments.

FIG. 24A illustrates an example of the first middle connecting member 7400. As shown in FIG. 24A, the first middle connecting member 7400 may include a first part 7410 which may be configured to act as a gusset plate and a second part 7420 which may be configured to insert into a slit of the column like member 7100. For example, the first part 7410 of the first middle connecting member 7400 may include various holes and slots to facilitate a connection between the first middle connecting member 7400 and a secondary member, for example, angle iron or tube steel, via bolting or riveting. Example embodiments, however, are not limited thereto as the first part 7410 may be formed without holes. In this latter embodiment, the first part 7410 may provide a surface to which a secondary member, for example angle iron or tube steel, may be welded. The second part 7420 may include a slot 7425 which may be configured to overlap with a slot 7525 of the second middle connecting member 7500. In example embodiments, the slot 7425 may extend from a bottom surface of the second part 7420. In example embodiments, the first middle connecting member 7400 may include a first surface 7415 and a second surface 7416 which may be welded to the column like member 7100 to secure the first middle connecting member 7400 to the column like member 7100.

Figure 24B:
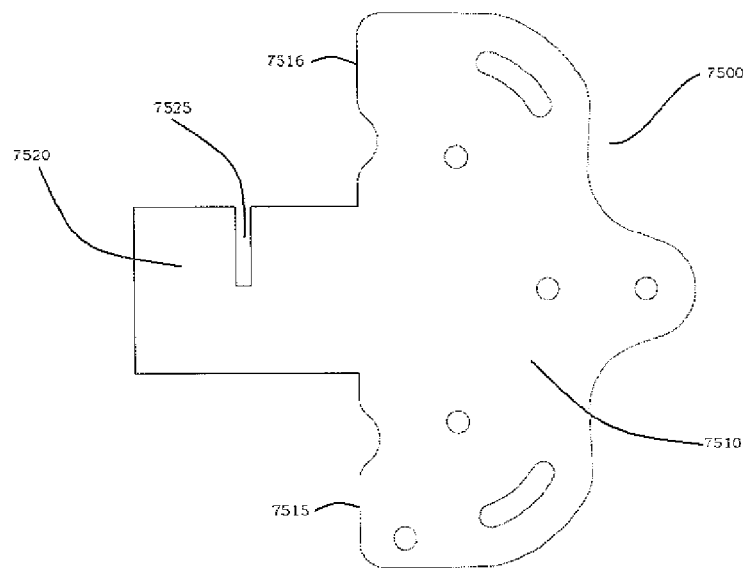

FIG. 24B illustrates an example of the second middle connecting member 7500. As shown in FIG. 24B, the second middle connecting member 7500 may include a first part 7510 which may be configured to act as a gusset plate and a second part 7520 which may be configured to insert into a slit of the column like member 7100. For example, the first part 7510 of the second middle connecting member 7500 may include various holes and slots to facilitate a connection between the second middle connecting member 7500 and a secondary member, for example, angle iron or tube steel, via bolting or riveting. Example embodiments, however, are not limited thereto as the first part 7510 may be formed without holes. In this latter embodiment, the first part 7510 may provide a surface to which a secondary member, for example angle iron or tube steel, may be welded. The second part 7520 may include a slot 7525 which may be configured to overlap with a slot of the first middle connecting member 7400. In example embodiments, the slot 7525 may extend from a top surface of the second part 7520. In example embodiments, the second middle connecting member 7500 may include a first surface 7515 and a second surface 7516 which may be welded to the column like member 7100 to secure the second middle connecting member 7500 in place.

Referring back to FIG. 22 it is noted that the lengths of the first and second middle connecting members 7400 and 7500 do not extend completely through a width of the column like member 7100. This, however, is not a limiting feature of example embodiments since the first and second middle connecting members 7400 and 7500 may be configured to extend the width of the column like member 7100 or even through a depth of the column like member 7100.

Figure 25:
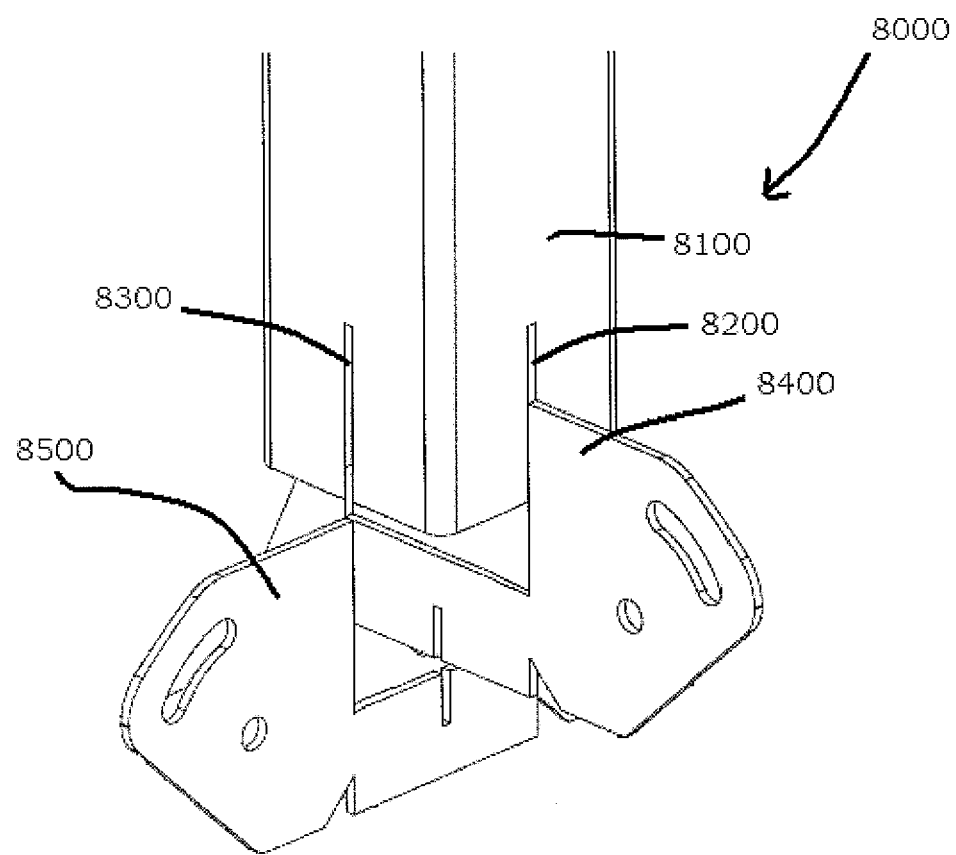
FIG. 25 is an exploded view of a structure in accordance with example embodiments.

Referring back to FIG. 6, it is noted that example embodiments describe a structure 100 which includes a first cross member 120, a second cross member 130, and an end plate 170 which are generally provided at an end of a structural tube 100. Example embodiments, however, are not limited thereto. For example, in FIG. 25 a structure 8000 in accordance with example embodiments may not include an end plate. For example, in FIG. 25, the structure 8000 includes a first cross member 8400 and a second cross member 8500 configured to be inserted into slots provided at an end of a structural tube 8100. In FIG. 25 only two slots 8200 and 8300 are illustrated, however, additional slots may be provided similar to the slots illustrated in FIGS. 8A-8E. In example embodiments, however, the slots provided at the end of the structural tube 8100 do not require different regions with different widths since the slots are not required to interface with tabs of an end plate. In example embodiments, the first and second cross members 8400 and 8500 may be substantially the same as the first and second cross members 120 and 130 illustrated in FIG. 7A, thus, a detailed description thereof will not be provided for the sake of brevity.

Figure 26:
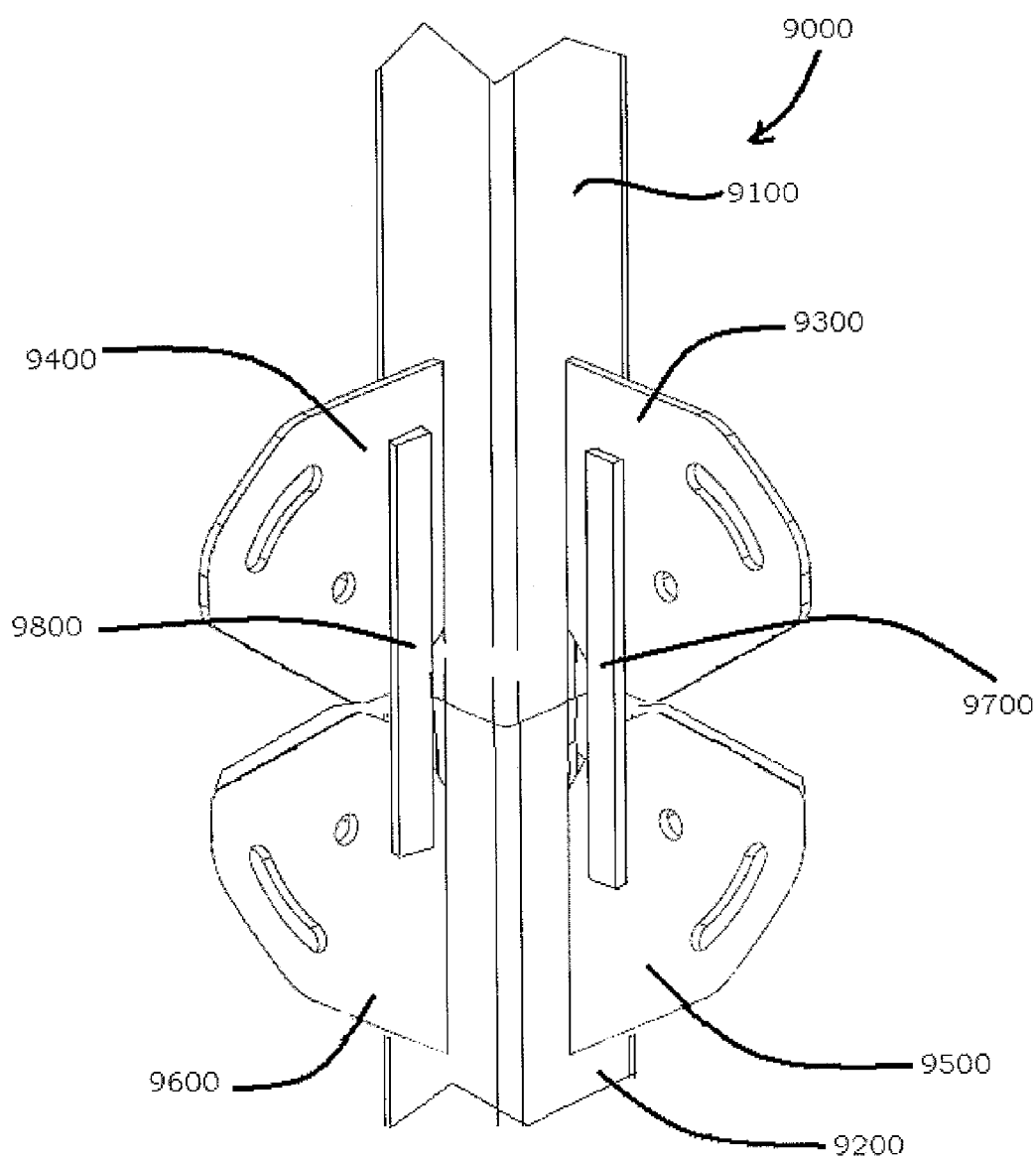
FIG. 26 is a view of a system in accordance with example embodiments.

FIG. 26 provides an example of a system 9000 in which a first structural tube 9100 is connected to a second structural tube 9200. In this example, the first structural tube 9100 may have a slotted end into which a first and second cross member 9300 and 9400 may be inserted. The first and second cross members 9300 and 9400 may be welded to the first structural tube 9100 after they are inserted into their corresponding slots. In example embodiments, the first and second cross members 9300 and 9400 may be similar to the previously described cross members 120 and 130. Thus a detailed description thereof is omitted for the sake of brevity. In this example, the second structural tube 9200 may have a slotted end into which a third and fourth cross member 9500 and 9600 may be inserted. The third and fourth cross members 9500 and 9600 may be welded to the second structural tube 9200 after they are inserted into their corresponding slots. In example embodiments, the third and fourth cross members 9500 and 9600 may be similar to the previously described cross members 120 and 130. Thus a detailed description thereof is omitted for the sake of brevity.

In example embodiments, a lower surface of the first cross member 9300 may be welded to an upper surface of the third cross member 9500. Likewise, a lower surface of the second cross member 9400 may be attached to an upper surface of the fourth cross member 9600 by welding. Thus, example embodiments provide for a structure in which ends of different structural tubes may be attached without the use of an end plate.

Alternatively, a first attachment plate 9700 may be provided to connect the first cross member 9300 to the third cross member 9500. The first attachment plate 9700, for example, may be bolted, riveted, or welded to each of the first and third cross members 9300 and 9500. The connection between the first cross member 9300 and the third cross member 9500 may be further strengthened by welding the first cross member 9300 to the third cross member 9500 as described above. In addition to providing the attachment plate 9700, a second attachment plate 9800 may be provided to connect the second cross member 9400 to the fourth cross member 9600. The second attachment plate 9800, for example, may be bolted, riveted, or welded to each of the second and fourth cross members 9400 and 9600. The connection between the second cross member 9400 and the fourth cross member 9600 may be further strengthened by welding the second cross member 9400 to the fourth cross member 9600. Thus, example embodiments provide for a structure in which ends of different structural tubes may be attached without the use of an end plate.

Figure 27:
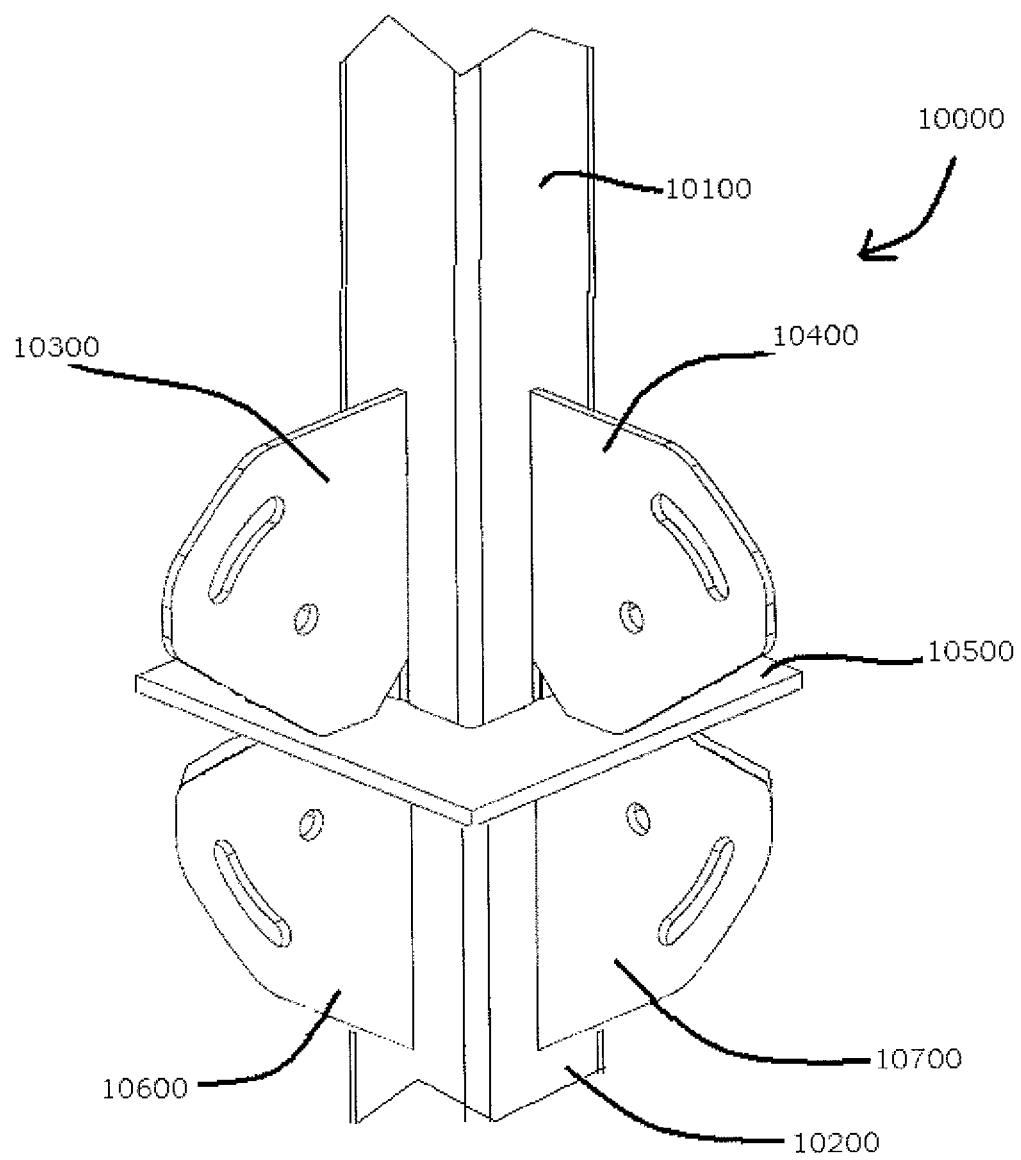
FIG. 27 is a view of a view of a system in accordance with example embodiments.

FIG. 27 provides an example of a system 10000 in which a first structural tube 10100 is connected to a second structural tube 10200. In this example, the first structural tube 10100 may have a slotted end into which a first and second cross member 10300 and 10400 may be inserted. The first and second cross members 10300 and 10400 may be welded to the first structural tube 10100 after they are inserted into their corresponding slots. In example embodiments, the first and second cross members 10300 and 10400 may be similar to the previously described cross members 120 and 130 and their connection to a plate 10500 may be similar to the system illustrated in FIGS. 6-7B. Thus a detailed description thereof is omitted for the sake of brevity. In this example, the second structural tube 10200 may have a slotted end into which a third and fourth cross member 10600 and 10700 may be inserted. The third and fourth cross members 10600 and 10700 may be welded to the plate 10500 after they are inserted into their corresponding slots. In example embodiments, the third and fourth cross members 10600 and 10700 may be similar to the previously described cross members 120 and 130. Thus a detailed description thereof is omitted for the sake of brevity.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A structure comprising:
    an end plate;
    a tube having a first stepped slot and a second slot, the first stepped slot having a first region with a first width and a first height and a second region with a second width and a second height, the second width being narrower than the first width and the second height being greater than the first height;
    a first cross member in the first stepped slot, the first cross member having a first region outside of the tube and a second region inside the tube, the second region of the first cross member including a third slot, the second region of the first cross member having a height substantially the same as the second height of the second region of the first slot; and
    a second cross member in the second slot, the second cross member having a third region outside of the tube and a fourth region inside the tube, the fourth region including a fourth slot, wherein the second region of the first cross member is in the fourth slot and the fourth region of the second cross member is in the third slot.

2. The structure according to claim 1, wherein the first region of the first cross member and third region of the second cross member are attached to an upper surface of the end plate.

3. The structure according to claim 2, wherein the first cross member includes a first face bearing against an outer surface of the tube and the second cross member includes a second face bearing against an outer surface of the tube.

4. The structure according to claim 3, wherein the tube includes a third slot and a fourth slot, and the first cross member is in the third slot and the second cross member is in the fourth slot.

5. The structure of claim 4, wherein the first cross member includes a fifth region outside of the tube and the second region of the first cross member is between the first region of the first cross member and the fifth region of the first cross member.

6. The structure of claim 5, wherein the second cross member includes a sixth region outside the tube and the fourth region of the second cross member is between the third region of the second cross member and the sixth region of the second cross member.

7. The structure of claim 6, wherein the first cross member includes a third bearing surface facing an outside surface of the tube and the third bearing surface is attached to an outside surface of the tube.

8. The structure of claim 7, wherein the second cross member includes a fourth bearing surface facing an outside surface of the tube and the fourth bearing surface is attached to the outside surface of the tube.

9. The structure of claim 1, wherein the first and second cross members are substantially perpendicular to each other.

10. The structure of claim 1, wherein the first region of the first cross member is configured to stiffen the tube and end plate.

11. The structure of claim 1, wherein the first region of the first cross member includes at least one aperture.

12. A system comprising:
    the structure according to claim 1; and
    a truss element attached to the first region of the first cross member.

13. The system according to claim 12, wherein the truss element is one of angle iron and channel iron.

14. The system according to claim 13, wherein the first region of the first cross member includes at least one aperture to facilitate connecting the truss element to the first region of the first cross member.

15. The structure according to claim 12, wherein the first region of the first cross member and third region of the second cross member are attached to an upper surface of the end plate.

16. The structure according to claim 15, wherein the first cross member includes a first face bearing against an outer surface of the tube and the second cross member includes a second face bearing against an outer surface of the tube.

17. The structure according to claim 16, wherein the tube includes a third slot and a fourth slot, the first cross member is in the third slot and the second cross member is in the fourth slot.

18. The structure of claim 17, wherein the first cross member includes a fifth region outside of the tube and the second region of the first cross member is between the first region of the first cross member and the fifth region of the first cross member.

19. The structure of claim 18, wherein the second cross member includes a sixth region outside the tube and the fourth region of the second cross member is between the third region of the second cross member and the sixth region of the second cross member.

20. The structure of claim 19, wherein the fifth region of the first cross member and sixth region of the second cross member include bearing surfaces attached to an outside surface of the tube.

* * * * *